(12) United States Patent
Sharma et al.

(10) Patent No.: US 9,809,466 B2
(45) Date of Patent: Nov. 7, 2017

(54) BI-METAL NANOADSORBENTS AND METHODS FOR THEIR PREPARATION AND USE

(75) Inventors: Ashutosh Sharma, Kanpur (IN); Nishith Verma, Kanpur (IN); Ajit Kumar Sharma, Kanpur (IN)

(73) Assignee: Indian Institute of Technology Kanpur, Kanpur, Uttar Pradesh (IN)

( * ) Notice: Subject to any disclaimer, the term of this patent is extended or adjusted under 35 U.S.C. 154(b) by 834 days.

(21) Appl. No.: 13/482,564

(22) Filed: May 29, 2012

(65) Prior Publication Data

US 2013/0319946 A1 Dec. 5, 2013

(51) Int. Cl.
| | |
|---|---|
| *B01J 37/00* | (2006.01) |
| *C02F 1/42* | (2006.01) |
| *C02F 1/28* | (2006.01) |
| *B82Y 30/00* | (2011.01) |
| *B01J 20/22* | (2006.01) |
| *B01J 20/28* | (2006.01) |
| *B01J 20/30* | (2006.01) |
| *C02F 1/44* | (2006.01) |
| *C02F 1/50* | (2006.01) |
| *C02F 101/10* | (2006.01) |
| *C02F 101/14* | (2006.01) |
| *C02F 101/20* | (2006.01) |
| *B82Y 40/00* | (2011.01) |

(52) U.S. Cl.
CPC .......... *C02F 1/288* (2013.01); *B01J 20/223* (2013.01); *B01J 20/28004* (2013.01); *B01J 20/28007* (2013.01); *B01J 20/28019* (2013.01); *B01J 20/3021* (2013.01); *B01J 20/3078* (2013.01); *B01J 20/3085* (2013.01); *B82Y 30/00* (2013.01); *B82Y 40/00* (2013.01); *C02F 1/281* (2013.01); *C02F 1/283* (2013.01); *C02F 1/285* (2013.01); *C02F 1/441* (2013.01); *C02F 1/505* (2013.01); *C02F 2101/103* (2013.01); *C02F 2101/14* (2013.01); *C02F 2101/20* (2013.01); *C02F 2303/04* (2013.01); *C02F 2305/08* (2013.01); *C02F 2307/06* (2013.01)

(58) Field of Classification Search
CPC .... C02F 1/288; B01J 20/223; B01J 20/28004; B01J 20/28007; B01J 20/28019; B01J 20/3021; B01J 20/3078; B01J 20/61085; B82Y 30/00
USPC ...... 210/688, 692, 701, 222, 656; 521/54, 55
See application file for complete search history.

(56) References Cited

U.S. PATENT DOCUMENTS

| | | | | |
|---|---|---|---|---|
| 4,427,793 | A * | 1/1984 | Reed et al. | 521/32 |
| 4,772,635 | A * | 9/1988 | Mitschker et al. | 521/34 |
| 5,583,162 | A * | 12/1996 | Li et al. | 521/56 |
| 6,171,489 | B1 * | 1/2001 | Ballard et al. | 210/222 |

(Continued)

OTHER PUBLICATIONS

Malana et al, "Adsorption studies of arsenic on nano aluminium doped manganese copper ferrite polymer (MA, VA, AA) composite: Kinetics and mechanism," Jun. 2011, Chemical engineering Journal 172, pp. 721-727.*

(Continued)

*Primary Examiner* — Claire Norris
(74) *Attorney, Agent, or Firm* — Pepper Hamilton LLP

(57) ABSTRACT

Bi-metal nanoadsorbents and methods for their preparation and use are provided. Methods of using bi-metal nanoadsorbents to remove contaminants from samples, such as water, are also provided.

20 Claims, 13 Drawing Sheets

(56) References Cited

U.S. PATENT DOCUMENTS

| | | | |
|---|---|---|---|
| 7,422,759 B2 | 9/2008 | Kepner et al. | |
| 7,449,236 B2* | 11/2008 | Lanphere et al. | 428/402 |
| 7,963,720 B2 | 6/2011 | Hoag et al. | |
| 2011/0124492 A1* | 5/2011 | Loukine et al. | 502/159 |

OTHER PUBLICATIONS

Malana et al, "Adsorption studies of arsenic on nano aluminium doped manganese copper ferrite polymer (MA, VA, AA) composite: Kinetics and mechanism." 2011, Chemical Engineering Journal, pp. 721-727.*

Alagumuthu et al., Equilibrium and kinetics of adsorption of fluoride onto zirconium impregnated cashew nut shell carbon, Chemical Engineering Journal (Apr. 15, 2010), 158(3):451-457 (Abstract).

Ansell et al., Magnetic molecularly imprinted polymer beads for drug radioligand binding assay, Analyst (Jul. 1998), 123:1611-1616.

Camacho et al., Adsorption equilibrium and kinetics of fluoride on sol-gel-derived activated alumina adsorbents, Journal of Colloid and Interface Science (Sep. 1, 2010), 349(1):307-313 (Abstract).

Chauhan et al., Investigations on activated alumina based domestic defluoridation units, Journal of Hazardous Materials (Jan. 2, 2007), 139(1):103-107 (Abstract).

Chen et al, Preparation and characterization of porous granular ceramic containing dispersed aluminum and iron oxides as adsorbents for fluoride removal from aqueous solution, Journal of Hazardous Materials (Nov. 26, 2010), 186:863-868.

Daifullah et al., Adsorption of fluoride in aqueous solutions using $KMnO_4$-modified activated carbon derived from steam pyrolysis of rice straw, Journal of Hazardous Materials (Aug. 17, 2007), 147(1-2):633-643 (Abstract).

Ding et al., Preparation of thermosensitive magnetic particles by dispersion polymerization, Reactive and Functional Polymers (Sep. 1, 1998), 38(1):11-15 (Abstract).

Ghorai et al., Equilibrium, kinetics and breakthrough studies for adsorption of fluoride on activated alumina, Separation and Purification Technology (Sep. 1, 2004), 42:265-270q.

Jang et al., Preloading Hydrous Ferric Oxide into Granular Activated Carbon for Arsenic Removal, Environ. Sci. Technol. (Mar. 27, 2008), 42(9): 3369-3374 (Abstract).

Kumar et al., Development of bi-metal doped micro- and nano multi-functional polymeric adsorbents for the removal of fluoride and arsenic(V) from wastewater, Desalination (May 31, 2011), 282:27-38.

Lounici et al., Fluoride removal with electro-activated alumina, Desalination (Mar. 1, 2004), 131(3):287-293 (Abstract).

Ma et al., Characteristics and defluoridation performance of granular activated carbons coated with manganese oxides, Journal of Hazard Materials (Sep. 15, 2009), 168(2-3):1140-1146 (Abstract).

Ma et al., Removal of trichloroethylene from water by cellulose acetate supported bimetallic Ni/Fe nanoparticles, Chemosphere (2006), 55(2):285-292 (Abstract).

Maliyekkal et al., Manganese-oxide-coated alumina: A promising sorbent for defluoridation of water, Water Research (Nov. 2006), 40(19):3497-3506 (Abstract).

Mukherjee et al., Arsenic Contamination in Groundwater: A Global Perspective with Emphasis on the Asian Scenario, J Health Nutr (Jun. 2006), 24(2):142-163.

Rana et al., Synthesis of magnetic beads for solid phase synthesis and reaction scavenging, Tetrahedron Letters (Nov. 12, 1999), 40(46):8137-8140 (Abstract).

Santa Maria et al., Preparation of composite materials containing iron in a cross-linked resin host based on styrene and divinylbenzene, European Polymer Journal (Sep. 26, 2002), 39:843-846.

Sujana et al., Characterization and fluoride uptake studies of nanoscale iron oxide-hydroxide synthesized by microemulsion method, International Journal of Engineering, Science and Technology (2010), 2(8):1-12.

Tripathy et al., Removal of fluoride from drinking water by adsorption to alum-impregnated activated alumina, Separation and Purcation Technology (Jul. 15, 2006), 50(3):310-317 (Abstract).

Zhang et al., Synthesis and adsorption properties of magnetic resin microbeads with amine and mercaptan as chelating groups, Journal of Applied Polymer Science (Sep. 4, 2001), 82(7):1587-1592 (Abstract).

Agarwal, M. et al., "Deflouridation of water using amended clay," Journal of Cleaner Production, vol. 11, No. 4, pp. 439-444 (2003).

Badruzzaman, M. et al., "Intraparticle diffusion and adsorption of arsenate onto granular ferric hydroxide (GFH)," Water Res., vol. 38, pp. 4002-4012 (2004).

Dang, S. V. et al., "Removal of arsenic from synthetic groundwater by adsorption using the combination of laterite and iron-modified activated carbon," J. Water and Environ. Technol., vol. 6, 43-54 (2008).

Das, N. et al., "Defluoridation of drinking water using activated titanium rich bauxite," Journal of Colloid and Interface Science, vol. 292, No. 1, pp. 1-10 (Aug. 29, 2005).

Das, R., et al., "Preparation and Antibacterial Activity of Silver Nanoparticles," Journal of Biomaterials and Nanobiotechnology, vol. 2, pp. 472-475 (Oct. 2011).

Datta, K. K. R, et al., Synthesis of agarose metal/semiconductor nanoparticles having superior bacteriocidal activity and their simple conversion to metal-carbon composites, J. Chem. Sci., vol. 120, No. 6, pp. 579- 586 (Nov. 2008).

Feng, Q. L., et al. "Antibacterial effects of Ag-HAp thin films on alumina substrates," Thin Solid Films, vol. 335, Issues 1-2, pp. 214-219 (1998).

Ghorai, S. and Pant, K.K., "Investigations on the column performance of Fluoride adsorption by activated alumina in a fixed bed," Chemical Engineering Journal, vol. 98, No. 1-2, pp. 165-173 (2004).

Gopal, V. et al., "Equilibrium, kinetic and thermodynamic studies of adsorption of fluoride onto plaster of Paris," Journal of Hazardous Materials, vol. 141, No. 1, pp. 98-105 (Jul. 1, 2006).

Guzman, M. G., et al., "Synthesis of silver nanoparticles by chemical reduction method and their antibacterial activity," International Journal of Chemical and Biological Engineering, vol. 2, No. 3, pp. 104-111 (2009).

Hong, H-J. et al., "Removal of arsenate, chromate and ferricyanide by cationic surfactant modified powdered activated carbon," Desalination, vol. 223, No. 1-3, pp. 221-228 (2008).

Kim, Y. H., et al., "Preparation and characterization of the antibacterial Cu nanoparticle formed on the surface of $SiO_2$ nanoparticles," J. Phys. Chem. B, vol. 110, No. 49, pp. 24923-24928 (Nov. 16, 2006).

Kong, H., and Jang, J., "Antibacterial Properties of Novel Poly(methyl methacrylate) Nanofiber Containing Silver Nanoparticles," vol. 24, No. 5, pp. 2051-2056 (Jan. 29, 2008).

Lenoble, V. et al., "Arsenic removal by adsorption on iron(III) phosphate," J. Hazard. Mater., vol. 123, No. 1-3, pp. 262-268 (May 17, 2005).

Mahapatra, S. S., and Karak, N., "Silver nanoparticle in hyperbranched polyamine: Synthesis, characterization and antibacterial activity," Materials Chemistry and Physics, vol. 112, Issue 3, pp. 1114-1119 (2008).

Mondal, P., et al., "Effects of adsorbent dose, its particle size and initial arsenic concentration on the removal of arsenic, iron and manganese from simulated ground water by Fe3+ impregnated activated carbon," Journal of Hazardous Materials, vol. 150, Issue 3, pp. 695-702 (May 17, 2007).

Page, K. et al., "Titania and silver-titania composite films on glass-potent antimicrobial coatings," Journal of Materials Chemistry, vol. 17, No. 1, pp. 95-104 (2007).

Park, S., et al., "Preparation of silver nanoparticle-containing semi-interpenetrating network hydrogels composed of pluronic and poly(acrylamide) with antibacterial property," Journal of Industrial and Engineering Chemistry, vol. 17, Issue 2, 2011, pp. 293-297 (Mar. 2, 2011).

(56) References Cited

OTHER PUBLICATIONS

Quang, D. V., et al. "Preparation of silver nanoparticle containing silica micro beads and investigation of their antibacterial activity," Applied Surface Science, vol. 257, Issue 15, pp. 6963-6970 (Mar. 10, 2011).

Ruparelia, J. P. et al., "Strain specificity in antimicrobial activity of silver and copper nanoparticles," Acta Biomaterialia, vol. 4, No. 3, pp. 707-716 (2008).

Sondi, I., and Salopek-Sondi, B., "Silver nanoparticles as antimicrobial agent: a case study on *E. coli* as a model for Gram-negative bacteria," Journal of Colloid and Interface Science, vol. 275, Issue 1, pp. 177-182 (Mar. 18, 2004).

Sathish, R. S. et al., "Equilibrium and Kinetic Studies for Fluoride Adsorption from Water on Zirconium Impregnated Coconut Shell Carbon," Separation Science and Technology, vol. 42, No. 4, pp. 769-788 (2007).

Yang, J. et al., "A novel synthetic route to metal-polymer nanocomposites by in situ suspension and bulk polymerizations," European Polymer Journal, vol. 44, pp. 1331-1336 (Feb. 20, 2008).

* cited by examiner

1

BI-METAL NANOADSORBENTS AND METHODS FOR THEIR PREPARATION AND USE

FIELD

Bi-metal nanoadsorbents and methods for their preparation and use are provided.

BACKGROUND

Over the past decade, significant increase in the concentration levels of arsenic and fluoride in surface water have been reported throughout the world. The primary reason is the rapid decline in the water table as increasingly more surface water is exploited for irrigated agriculture, and rural and urban water supply. Risk to the human health has increased with increased concentration levels of these solutes in potable water. Adsorption has shown considerable potential in removing arsenic and fluoride from water. While many technologies such as precipitation and coagulation, chemical oxidation, membrane, ion-exchange, and biological treatment are also in place for the removal of contaminants, such as arsenic and fluoride, from wastewater exist they are not efficient, cost-effective, and applicable to where water is scarce.

A variety of adsorbents have been previously developed for the removal of fluoride and arsenic from wastewater. Activated alumina and alumina supported metal oxides are common adsorbents used for defluoridation applications. Activated carbon or metals impregnated with activated carbon has also achieved limited success. Activated carbon micro- and nanofibers dispersed with Al was synthesized, and found effective in removing fluoride from wastewater. With regard to the remediation of arsenic laden wastewater, there have been studies on the development of Fe-modified activated carbon in the form of either powders or granules or fibers. With Fe possessing large and selective affinity towards arsenic because of the formation of strong surface complexes, and activated carbon providing a large surface area for impregnation, a variety of Fe-doped carbon based adsorbents have been synthesized for the removal of arsenic. Fe-doped activated micro/nano carbon particles have also been developed as adsorbents for arsenic removal.

Previous adsorbents were either made with inferior processes or do not adsorb a sufficient quantity of contaminants. There is still a need for improved adsorbent materials.

SUMMARY OF THE INVENTION

Embodiments provide methods of preparing a polymeric bead comprising a plurality of metals or salts thereof. In some embodiments, the method comprises preparing a mixture of one or more monomers, a crosslinking agent, a suspension stabilizing agent, and a plurality of metals, or metal salts thereof, under conditions sufficient to produce a polymeric bead doped with a plurality of metals or salts thereof. In some embodiments, the one or more monomers, solvent and catalyst are heated to form a heated mixture.

In some embodiments, the heated mixture is contacted with an aqueous solution to yield a first mixture. In some embodiments, the first mixture is contacted with the crosslinking agent to yield a cross-linked mixture. In some embodiments, the cross-linked mixture is contacted with the suspension stabilizing agent to yield a second mixture. In some embodiments, the second mixture is contacted with a plurality of metals or salts thereof to yield a third mixture.

In some embodiments, the third mixture is heated and cooled to produce a composition comprising a polymeric bead. In some embodiments, the method comprises isolating the polymeric bead.

In some embodiments, the method comprises further comprising carbonizing the polymeric bead. In some embodiments, the method comprises carbonizing and activating the polymeric bead prior to carbonizing the polymeric bead.

In some embodiments, the method comprises reducing the size of the polymeric bead.

In some embodiments, the plurality of metals or salts thereof is selected from Al, Fe, Ni, Cu, Ag, Co, Mo, Au, Pt, a salt thereof, or any combination thereof. In some embodiments, the metal salt is aluminum nitrate, ferric chloride, nickel nitrate, cupric chloride, or any combination thereof. In some embodiments, the polymeric bead comprises Al and Fe, or Fe and Ni, or Al and Ni, or Cu and Ni, or Cu and Fe, or Cu and Al.

In some embodiments, a polymeric bead doped with a plurality of metals or salts thereof is provided. In some embodiments, the bead has a diameter of less than about 1,000 nm. In some embodiments, the polymeric bead is doped with at least two of Al, Fe, Ni, Cu, Ag, Co, Mo, Au, or Pt, or a salt thereof. In some embodiments, the polymeric bead comprises Al and Fe, or Fe and Ni, or Al and Ni, or Cu and Ni, or Cu and Fe, or Cu and Al. In some embodiments, the bead is a porous bead. In some embodiments, the bead is a non-porous bead.

In some embodiments, a multi-functional absorbent material for removal of a plurality of contaminants from a sample is provided. In some embodiments, the multi-functional absorbent comprises at least one polymeric bead doped with a plurality of metals or a salt thereof. In some embodiments, the plurality of metals is selected from at least two of Al, Fe, Ni, Cu, Ag, Co, Mo, Au, and Pt or a salt thereof. In some embodiments, the multi-functional absorbent comprises Al and Fe, Fe and Ni, Al and Ni, Cu and Ni, Cu and Fe, or Cu and Al. In some embodiments, the multi-functional absorbent material is configured to adsorb arsenic, fluoride, vitamin B-12, or a combination thereof. In some embodiments, the multi-functional absorbent material is configured to adsorb arsenic, fluoride, or vitamin B-12 from water.

In some embodiments, compositions comprising a plurality of polymeric beads doped with a plurality of metals or salts thereof, wherein the plurality of polymeric beads have substantially the same diameter are provided. In some embodiments, the diameter is less than 1000 nm.

In some embodiments, methods of adsorbing at least one contaminant from a sample are provided. In some embodiments, the method comprises contacting the sample with at least one polymeric bead doped with a plurality of metals or salts thereof, wherein the at least one contaminant is adsorbed onto the polymeric bead. In some embodiments, at least two contaminants are adsorbed onto the bead. In some embodiments, the contaminant is arsenic, fluoride, Vitamin B-12, or any combination thereof. In some embodiments, the sample is water. In some embodiments, the sample is wastewater.

In some embodiments, a water filter comprising a multi-functional adsorbent, wherein the multi-functional absorbent material is configured for removal of a plurality of contaminants from a sample is provided. In some embodiments, the multi-functional absorbent comprises at least one polymeric bead doped with a plurality of metals or a salt thereof, wherein the bead has a diameter of less than 1,000 nm.

In some embodiments, a water system comprising a water filter, the water filter comprising a multi-functional adsorbent is provided. In some embodiments, the multi-functional absorbent material is configured for removal of a plurality of contaminants from a sample, the multi-functional absorbent comprising at least one polymeric bead doped with a plurality of metals or a salt thereof, wherein the bead has a diameter of less than 1,000 nm. In some embodiments, the water filter is coupled to a drinking outlet.

DETAILED DESCRIPTION

Figure 1:
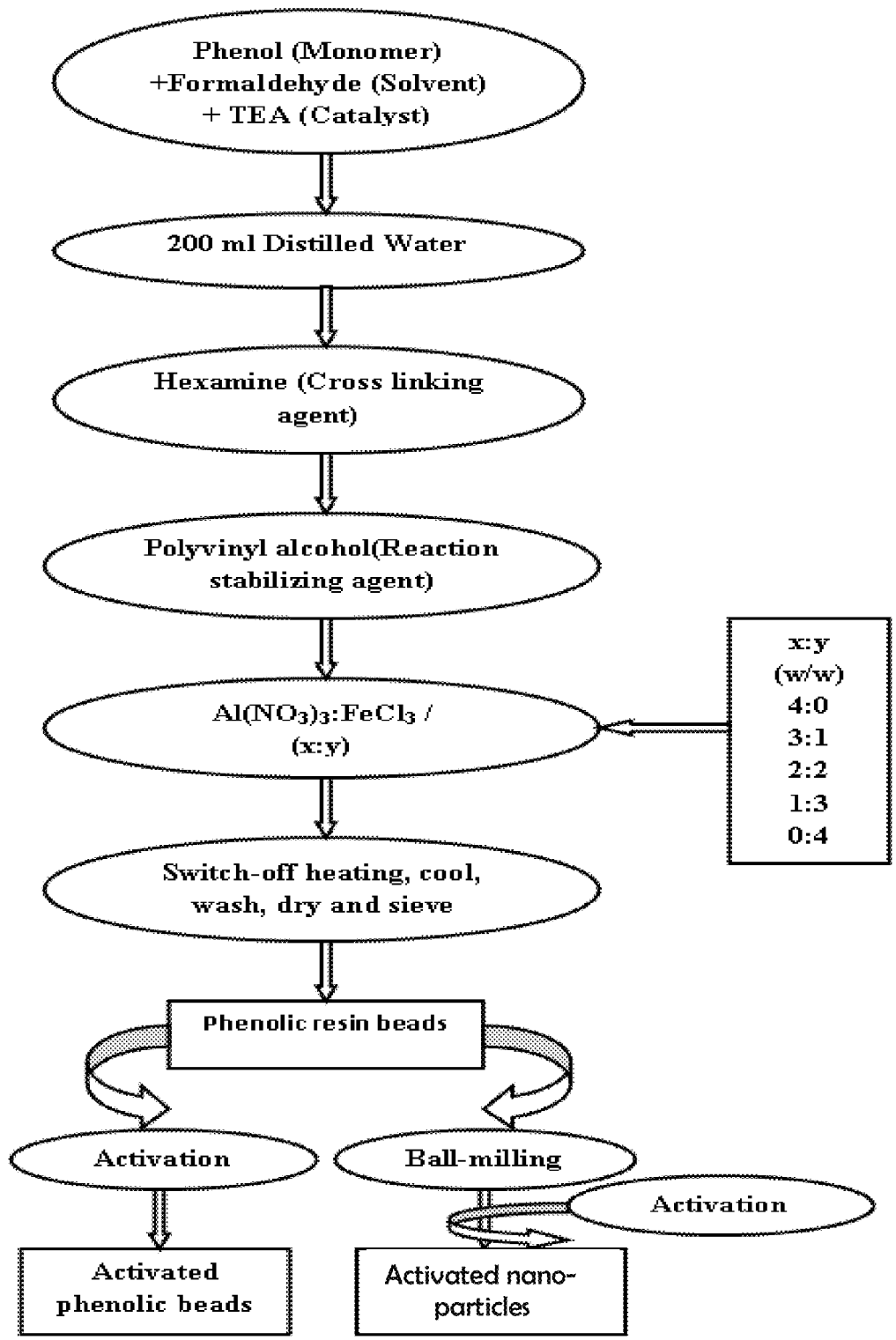
FIG. 1 illustrates an exemplary flow diagram of the synthesis of bi-metal doped adsorbent particles.

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used herein the term "bead" can refer to a particle or nanoparticle. The size of a particle or nanoparticle is as described herein or as context dictates.

The embodiments described herein can be used for adsorbing contaminants or other substances from solutions. The present embodiments, which use adsorption, provide unexpected and strategic advantages over previously used methods and compositions. The embodiments described herein use less water, which allows the embodiments to be used in areas where water is scarce. The embodiments described herein use less energy making them more cost-efficient and also being able to use where power sources are not constant or reliable. Additionally, in some embodiments, no additional chemicals are combined with the absorbents described herein to remove the contaminants from different solutions, such as from wastewater. In some embodiments, the methods described herein do not include a post-treatment step. That is, the solutions are treated with the absorbents and nothing other than removing the absorbents is required to use the treated water.

The present embodiments provide for the incorporation of metals within polymeric beads. The metals can, for example, be incorporated into the beads during a polymerization step. The present embodiments also provide for the incorporation of a plurality of metals into a polymeric bead. The beads can be used, for example, for the removal of contaminants, such as but not limited to, fluoride and arsenic from water as well as other contaminants that can be adsorbed by metals.

Examples of metals that can be incorporated into polymeric beads include, but are not limited to, Al, Fe, Ni, Cu, Ag, Co, Mo, Au, Pt or a salt thereof, or any combination thereof. Examples of metal salts that can be incorporated into polymeric beads include, but are not limited to, aluminum nitrate, ferric chloride, nickel nitrate, or cupric chloride, or any combination thereof. In some embodiments, a combination of metals or salts thereof are incorporated into the beads. Examples of combinations include, but are not limited to, Al and Fe, or Fe and Ni, or Al and Ni, or Cu and Ni, or Cu and Fe, or Cu and Al.

Accordingly, embodiment provides methods of preparing polymeric beads comprising a plurality of metals or salts thereof. In some embodiments, the method comprises preparing a mixture of one or more monomers, a crosslinking agent, a suspension stabilizing agent, and a plurality of metals or salts thereof under conditions sufficient to produce a polymeric bead comprising a plurality of metals or salts thereof. In some embodiments, only one type of monomer is used. In some embodiments, two different monomers are used. In some embodiments, more than two different monomers are used.

In some embodiments, the method comprises heating the monomer(s), solvent, and catalyst to form a heated mixture. In some embodiments, the monomer, solvent, and catalyst are mixed at room temperature (e.g. 20-30° C.) until the mixture is homogenous. The mixture can then be heated to a temperature of about 100° C. The mixture can be heated at any rate including but not limited to 1, 2, 3, 4, or 5° C./minute.

In some embodiments, the monomer is an alcohol. In some embodiments, the monomer is an aromatic alcohol. In some embodiments, the monomer is phenol. In some embodiments, the monomer is vinyl benzyl alcohol, cresol, orbytylphenol, or combinations thereof. The monomer can also be non aromatic. For example, methyl methacrylate (MMA), a non-aromatic compound can be used as the monomer. The MMA monomers will produce a P(poly) MMA based polymeric beads. For different alcohols different conditions will be used and can be determined based upon the description contained herein.

In some embodiments, the solvent is formaldehyde, but can be any other organic solvent or solvent that is appropriate for the monomer being used to synthesize the polymeric beads. Examples of solvents include, but are not limited formaldehyde, acetaldehyde, paraldehyde, and glyoxal, or any combination thereof.

In some embodiments, the catalyst is a base catalyst. In some embodiments, the catalyst is TEA (triethylamine). Other catalysts can be used. Examples of catalysts that can be used include, but are not limited to, any amine catalyst. Examples of catalysts include, but are not limited to, TEA, sodium hydroxide, barium hydroxide, dimethylamine, which can be used alone or in combination with any other catalysts.

In some embodiments, after the mixture is heated, the heated mixture is contacted with an aqueous solution to yield a first mixture. In some embodiments, the aqueous solution is water. In some embodiments, the first mixture is mixed for about 10, 20, 30, 40, 50, or 60 minutes. In some embodiments, the first mixture is mixed for at least 10, 20, 30, 40, 50, or 60 minutes. In some embodiments, the aqueous solution consists of water.

In some embodiments, the method comprises contacting the first mixture with a cross-liking agent. Contacting the first mixture with a cross-linking agent will yield a cross-linked mixture. In some embodiments, the cross-linking agent is hexamethylenetetramine (HMTA or hexamine), triethylene diamine and sulfuric acid, or any combination thereof. In some embodiments, after contacting the first mixture with a cross-linking agent the mixture is heated. In some embodiments, the mixture is heated until the temperature reaches about 70, 80, 90, 100, or 110° C. The temperature can be increased, for example, at a rate of about 1, 2, 3, 4, or 5° C./minute until the target temperature is reached.

In some embodiments, the cross-linked mixture is contacted with a suspension stabilizing agent to yield a second mixture. In some embodiments, the suspension stabilizing agent is PVA (polyvinyl alcohol), gum acacia powder (GAP) or polyvinyl pyrodidone, or any combination thereof. Other suspension stabilizing agents can also be used, the list provided herein should not be considered limiting. In some embodiments, the suspension stabilizing agent and cross-linked mixture can be mixed for about, or at least, 10, 15, 20, 25, 30, 35, 40, 45, 50, 55, or 60 minutes.

In some embodiments, the second mixture is contacted with a plurality of metals or salts thereof to yield a third mixture. In some embodiments, the third mixture can then be heated. After heating the third mixture, the mixture is cooled to produce a composition comprising the polymeric beads. The metals can be added sequentially or simultaneously. In some embodiments, the metals are added at different times, such as about 1, 2, 3, 4, 5, 6, 7, 8, 9, or 10 minutes apart. In some embodiments, the metals are added at least 1, 2, 3, 4, 5, 6, 7, 8, 9, or 10 minutes apart. In some embodiments, the metals are added about 1 to 10, 1 to 9, 1 to 8, 1 to 7, 1 to 6, 1 to 5, 1 to 4, 1 to 3, or 1 to 2 minutes apart. In some embodiments, the metals are added about 2 to 10, 2 to 9, 2 to 8, 2 to 7, 2 to 6, 2 to 5, 2 to 4, or 2 to 3 minutes apart. In some embodiments, the metals are added about 3 to 10, 3 to 9, 3 to 8, 3 to 7, 3 to 6, 3 to 5, 3 to 4 minutes apart. In some embodiments, the metals are added about 4 to 10, 4 to 9, 4 to 8, 4 to 7, 4 to 6, or 4 to 5 minutes apart. In some embodiments, the metals are added about 5 to 10, 5 to 9, 5 to 8, 5 to 7, or 5 to 6 minutes apart. The metals can also be added in different ratios to one another. In some embodiments, the first metal (or salt thereof) is added in a 3:1, 1:1, or 1:3 ratio to a second metal (or salt thereof). Other ratios may also be used to affect the final amount of each metal that is incorporated into the polymeric beads.

After the metals or salts thereof are added, the reaction mixture can be continued to be heated. In some embodiments, the mixture is stirred. In some embodiments, the rate of mixing is kept constant. Without wishing to be bound by any theory, the rate of mixing is kept constant to avoid solidification of the beads. The mixture containing the metals or salts thereof can be heated, for example, for about, or at least, 1, 2, 3, 4, 5, 6, 7, 8, 9, or 10 hours. In some embodiments, the mixture is heated for about 1-10, 1-9, 1-8, 1-7, 1-6, 1-5, 1-4, 1-3, or 1-2 hours. In some embodiments, after heating, the mixture is allowed to cool. The cooling can be accelerated by incubating the mixture in a cooling bath or the reaction be cooled by exposing the reaction or reaction vessel to the ambient temperature.

In some embodiments, the bead comprising the plurality of metals or salts thereof is isolated. The beads can be isolated once the reaction reaches room temperature. Any method of isolation can be used. In some embodiments, isolating the polymeric bead comprises filtering the polymeric bead. In some embodiments, the method also comprises fractionating the polymeric bead to produce a composition comprising a polymeric bead of substantially uniform diameter. Fractionating the beads based upon size allows the beads to be grouped according to a specific size or range of sizes. Any method of fractionating, such as but not limited using sieves, can be used. The isolated beads can also be washed with various solutions, such as, but not limited to, water, alcohol, acetone, and the like. In some embodiments, the beads are washed with water, methanol, or acetone, or any combination thereof. In some embodiments, the washing alcohol is ethanol, methanol, isopropanol, or any combination thereof.

In some embodiments, the methods further comprise carbonizing the polymeric bead. The beads can be carbonized, for example, in a ceramic boat at a sufficient temperature and for a sufficient amount of time. In some embodiments, the beads are carbonized at a temperature of about 900-1100° C., about 900, 1000, 1050, or 1100° C. In some embodiments, the beads are carbonized for about 10, 20, 30, 40, 50, 60, 70, 80, 90, 100, 110, or 120 minutes. In some embodiments, the beads are carbonized in $N_2$ atmosphere. Other inert gases can also be used. In some embodiments, prior to the carbonization, the beads are pre-heated from room temperature to the carbonization temperature at a heating rate of about 1, 2, 3, 4, or 5° C./minute.

In some embodiments, the beads are carbonized and activated. In some embodiments, the beads are activated after carbonization. The activation of the beads can be performed in the same furnace that is used to carbonize the beads, but need not be. In some embodiments, the carbonized beads are activated by steam. In some embodiments, the beads are activated at a temperature of about 800-1100° C. In some embodiments, the beads are activated at a temperature of about 800, 850, 900, 950, 1000, 1050, or 1100° C. In some embodiments, the carbonized beads are activated for about 10, 20, 30, 40, 50, 60, 70, 80, 90, 100, 110, or 120 minutes. In some embodiments, the beads are carbonized at a temperature of about 850° C. and the beads are activated at a temperature of about 1000° C.

The beads that are produced by the methods described herein will have various sizes. The beads can be manipulated to reduce the size for different applications. Therefore, in some embodiments, a method is also provided that comprises reducing the size of the polymeric bead. In some embodiments, the method comprises milling the bead. The beads can be milled, for example, with a ball mill. The ball mill will lead to the reduction in size of the polymeric beads. For example, ball milling can reduce the beads of an original size of about 0.5 mm to an average size of about 100 nm. Without wishing to be bound by any theory, the reduction in size occurs because of the rupturing of macro-pores present in the beads. Therefore, in some embodiments, the beads that are reduced in size are non-porous. The beads can then be referred to, in some embodiments, as nonporous nanoparticles. In some embodiments, the size of a particle (e.g. bead) prior to milling can be 1 micron to 1000 microns. In contrast, after the particle is milled, the size of the particle can be reduced to about 10 nm to 500 nm. In some embodiments, the average size of the particle prior to milling is about 500 micrometers. In some embodiments, the average size of the particle after milling is about 100 nm. The smaller particle can be referred to as a "nanoparticle."

In some embodiments, the size of the bead (prior to milling) produced is about 100 nm to about 0.5 mm or about 1 micron to about 1000 microns. As discussed herein, the particles can be fractionated to obtain a particle size of a specific average size. In some embodiments, the particles can then be milled to reduce the size. In some embodiments, the reduced size is about 1 nm to about 200, about 50 to about 200, about 50 to about 150, about 50 to about 100, about 100 to about 200, about 100 to about 150 nm. In some embodiments, a composition comprises particles (e.g. nanoparticles) having an average size of about 100 nm is provided. In some embodiments, a composition comprises beads having an average size of about 0.5 mm is provided. The average size refers to the average diameter of the bead.

Polymeric bead(s) doped with a plurality of metals or salts thereof, wherein the bead has a diameter of less than 1,000 nm are provided. In some embodiments, the diameter is about 100 nm. In some embodiments, the metal or salt thereof is not present on the surface of the bead. In some embodiments, about, or at least, 10, 20, 30, 40, 50, 60, 70, 80, 90, 95, or 99% of the metals or salts thereof are not present on the surface of the bead or particle. "On the surface" refers to the metal being located on the exterior of the bead or particle.

As described herein the beads can be reduced in size by, for example, milling. The milled beads can have the metal(s), or salts thereof, only present on the surface. Accordingly, in some embodiments, the porous beads or particle does not contain any metal on the surface. In some embodiments, the porous bead or particle In some embodiments, about, or at least, 10, 20, 30, 40, 50, 60, 70, 80, 90, 95, or 99% of the metals or salts thereof are not present on the surface of the porous bead or particle. The non-porous particle that may be produced has the metal on the surface. If metal is incorporated inside of the bead or particle then it is not considered to be "on the surface." In some embodiments, the polymeric bead is doped with at least two of Al, Fe, Ni, Cu, Ag, Co, Mo, Au, Pt or a salt thereof. In some embodiments, the polymeric bead comprises Al and Fe, or Fe and Ni, or Al and Ni, or Cu and Ni, or Cu and Fe, or Cu and Al. In some embodiments, the ratio of the two metals, or salt thereof, is about 1:1, 1:2, 1:3, or 1:4. In some embodiments, the bead is a porous bead. In some embodiments, the bead is a nonporous bead.

Multi-functional absorbent material useful for removal of one or a plurality of contaminants from a sample are also provided. In some embodiments, the multi-functional absorbent comprises at least one polymeric bead doped with a plurality of metals or a salt thereof, wherein the bead has a diameter of less than about 1,000 nm. The metals or salts thereof can be any metal or salt thereof capable of absorbing contaminants. Examples of such metals or salts thereof are provided herein. For example, in some embodiments, the plurality of metals is selected from at least two Al, Fe, Ni, Cu, Ag, Co, Mo, Au, Pt or a salt thereof. In some embodiments, the multi-functional absorbent comprises Al and Fe, Fe and Ni, Al and Ni, Cu and Ni, Cu and Fe, or Cu and Al. In some embodiments, multi-functional absorbent material is configured to absorb arsenic, fluoride, or vitamin B-12, or a combination thereof. In some embodiments, a bead or particle comprising iron (Fe), or a salt thereof can adsorb arsenic. In some embodiments, a bead or particle comprising Al, or salt thereof, can adsorb fluoride. In some embodiments, a bead or particle comprising Ni, or salt thereof, can adsorb B-12. In some embodiments, the beads or particles comprise more than one metal, or salt thereof, and therefore, can adsorb a combination, or mixture, of contaminants. In some embodiments, the multi-functional absorbent material is configured to absorb arsenic, fluoride, vitamin B-12, or a combination thereof from water or wastewater.

Compositions comprising a plurality of polymeric beads or nanoparticles doped with a plurality of metals or salts thereof, wherein the plurality of polymeric beads or nanoparticles have substantially the same diameter are provided. In some embodiments, the diameter is about 100 nm. In some embodiments, the diameter is less than 1000 nm. In some embodiments, the diameter is about 0.5 mm (500 μm). In some embodiments, the average size of a nanoparticle that is produced by milling (e.g. ball milling of the larger particle) is about 100 nm (nano-meter). The smaller particles produced by milling the beads can be referred to as "nanoparticles."

Methods of adsorbing at least one contaminant from a sample are provided. In some embodiments, the method comprises contacting the sample with at least one polymeric bead doped with a plurality of metals or salts thereof, wherein the at least one contaminant is adsorbed onto the polymeric bead. The metals or metal salts can be any metal described herein or a metal that can adsorb a contaminant onto the polymeric bead. In some embodiments, the method comprises adsorbing at least two contaminants onto the bead. In some embodiments, the contaminant is arsenic, fluoride, Vitamin B-12, or any combination thereof. In some embodiments, the bead or particle can be configured to kill or inhibit the growth of microbes present in water. In some embodiments, a bead or particle configured to kill or inhibit the growth of microbes in water comprise Cu or Ag, or combinations thereof. In some embodiments, fluoride and arsenic are adsorbed onto the bead. In some embodiments, the sample is water, drinking water, waste water, or any combination thereof. "Drinking water" is water that is intended to be consumed by animals, such as humans, pets, or farm animals.

Filters comprising the adsorbents are also provided. In some embodiments, a filter comprising one or more multi-functional adsorbents is provided. The filter can also comprise other materials such as activated charcoal, membranes, or other materials commonly found in filters used to filter drinking water. In some embodiments, the filter is a filter that is attached directly to a faucet such that the water exiting the faucet passes through the filter. In some embodiments, the filter is placed upstream of the faucet. The filter can be, for example, be placed where the water enters a supply line in a home or business. In some embodiments, the filter is in a water pumping station. Filters can be configured depending upon the use and where the water is treated.

In some embodiments, a water system comprising a multi-functional adsorbent is also provided. In some embodiments, the water system comprises a filter comprising the multi-functional adsorbents. In some embodiments, the water system comprises a reservoir. In some embodiments, the reservoir comprises the multi-functional adsorbents. In some embodiments, the water system comprises a filter that filters out, and or recycles, the multi-functional adsorbents prior to the water entering the watery supply line. In some embodiments, the water system comprises a pumping station that pumps water to an end user (e.g. home or business). In some embodiments, the water system comprises a filter system that comprises a multi-functional adsorbent. The filter system can, for example, comprise multiple filters that comprise different filtering products. In some embodiments, the filter system comprises an activated charcoal system. In some embodiments, the filter system comprises a reverse-osmosis membrane. In some embodiments, the water filter comprising the multi-functional adsorbent is coupled to a drinking outlet. A drinking outlet can be any source from which drinking water can be obtained. Examples of drinking outlets include, but are not limited to, faucets, water fountains, hoses, and the like. A water filter that is upstream of a drinking outlet is one where the water passes through the filter prior to exiting the outlet. A water filter that is downstream of a drinking outlet passes through the outlet and then through the water filter prior to being consumed by an end user. Therefore, the water filter can be upstream, downstream, or a combination thereof, of a drinking outlet.

EXAMPLES

Example 1: Preparation of Polymeric Beads Comprising Al and Fe by Suspension Polymerization All reagents used were high purity grade. The phenol, hexamethylene tetraamine (HMTA), formaldehyde, triethylamine (TEA), 95% hydrolyzed poly vinyl-alcohol (PVA, avg. MW=95000), ferric chloride, aluminum nitrate (Al(NO3)3), sodium fluoride (NaF) and sodium arsenate hepta ($Na_2HAsO_4$) were purchased from Merck (Germany). All solutions were prepared in water obtained from a Milli-Q system (Millipore, Bedford, Mass.).

The Al and Fe doped polymeric beads were prepared by suspension polymerization. The polymerization reaction was performed in a 2-L three-neck glass vessel mounted over a heating mantle and equipped with a reflux water condenser, thermometer and continuous stirrer. The detailed description of the equipment used for the polymerization reaction is available (J. Hazard. Mater. 150 (2008) 695-702). Phenol (50 g of the monomer) was heated to the molten stage before mixing it with 63 ml of formaldehyde (solvent) and 1.5 ml of TEA (basic catalyst). At room temperature (~30° C.) while stirring at 370-410 rpm, the solution became homogenous in 6-8 hours. Subsequently, 200 ml of distilled water was added to the reaction vessel. After 30 minutes, 3.5 g of HMTA (cross linking agent) was added, and the vessel was heated at a rate of 3° C./minute until the temperature reached 100° C. Approximately 45 minutes after the addition of hexamine, 3 g of PVA (suspension stabilizing agent) was added. The time when the PVA was added was found to be critical to the quality of the beads produced. Approximately 35 minutes after the PVA was added, aluminum nitrate and ferric chloride were simultaneously added to the reaction mixture. The metallic salts were added in five different proportions (4:0, 3:1, 2:2, 1:3, 0:4) to the reaction mixture, keeping the total amounts of the salts constant at 4 g. Therefore, five different adsorbents with different Al and Fe loadings were prepared in this study.

In this example, different total amounts of inorganic (Fe and Al) salts were used during the suspension polymerization. However, the polymeric beads were first synthesized without incorporating metals, and optimized the operating conditions of polymerization (the amount of monomer and other reagents, temperature, stirring speed, etc.) for producing the uniform spherical phenolic beads of relative large size (about 1 mm), with maximum product-yield. The optimized amount of monomer (50 g in the present case) used for the polymerization reaction was, therefore, limited by the volume (2 L) of the existing reaction vessel used in the experiment. It was also observed that increasing the total amount of the inorganic salts in excess of 4 g relative to 50 g of phenol used as a monomer, the shapes of the products (beads) formed after curing were irregular (non-spherical), often resulting into undesirable flakes-like products. In addition, the yield after the carbonization and activation of the polymeric beads was relatively small (<30%). The combined weight of the inorganic salts was, therefore, optimized at 4 g, with different amounts (4:0, 2:2, and 0:4) of individual salts.

After the addition of the salts, the reaction mixture continued to be heated. During the reaction, the speed of the stirrer was never allowed to fluctuate from the initially fixed set value to avoid solidification of the product. After 3 hours, the heating was stopped, and the reactor was allowed to cool in the still air. When the temperature of the reaction products reached room temperature, the products were filtered to separate the solids from the residual liquid. The filtered product (spherical beads of an average size of about 0.8 mm) was washed three times with distilled water, then by methanol, followed by acetone. Finally, the prepared beads were sieved. In a typical experiment, the yield was approximately 30 g (15-16% w/w). The different phenolic beads were labeled as PH_40, PH_31, PH_22, PH_13, and PH_04, depending on the relative amounts of Al and Fe added to the reaction mixture. For example, PH_40 represents the polymeric beads doped with 4 g of Al-salts, whereas PH_04 represents the polymeric beads doped with 4 g of Fe-salts, and PH_22 represents the polymeric beads doped with 2 g each of Al- and Fe-salts, and so forth.

Example 2: Preparation of Activated Micro and Nano Sized Particles

The prepared polymeric beads were carbonized then physically activated using steam in a horizontal tubular furnace. The beads were carbonized in a ceramic boat at 1050° C. for 1 hour under a $N_2$ atmosphere. Prior to the carbonization, the beads were pre-heated from room temperature to the carbonization temperature at a heating rate of 5° C./minute. Subsequent to the carbonization, the activation was performed for 1 hour by steam at 900° C. in the same tubular furnace. The yield of the carbonized and activated beads typically varied between 42% and 45% of the initial weight of the polymeric beads. The prepared carbonized/activated beads were labeled as APH_40, APH_31, APH_22, APH_13 and APH_04, with the prefix A to denote activated samples. The carbonization and activation caused an approximately 60% reduction in the particle size, with the average size of the carbonized/activated beads measured as about 0.50 mm. Some samples of the PH_22 beads were crushed by ball-milling to the nano-size (about 200 nm). These particles (labeled as PH22_BM) were also carbonized and activated in the same tubular furnace to create activated nano particles containing Al and Fe. The activation and carbonization conditions were the same as those used for preparing the activated beads, except that the carbonization and activation temperatures were set to 1000° C. and 850° C., respectively, which were slightly lower than the previous conditions. The lower temperatures were chosen to minimize the yield-loss of the products.

FIG. 1 contains the flow diagram for the synthesis of the bi-metal (Al and Fe) doped micro and nano sized adsorbents in this study. As shown, the method to prepare the activated micro and nano sized adsorbents was the same and consisted of polymerization followed by carbonization and activation. The metals were incorporated during an intermediate step. The nano sized adsorbents were prepared with the additional steps of milling the micro sized polymeric beads, followed by carbonization and activation.

Figure 2:
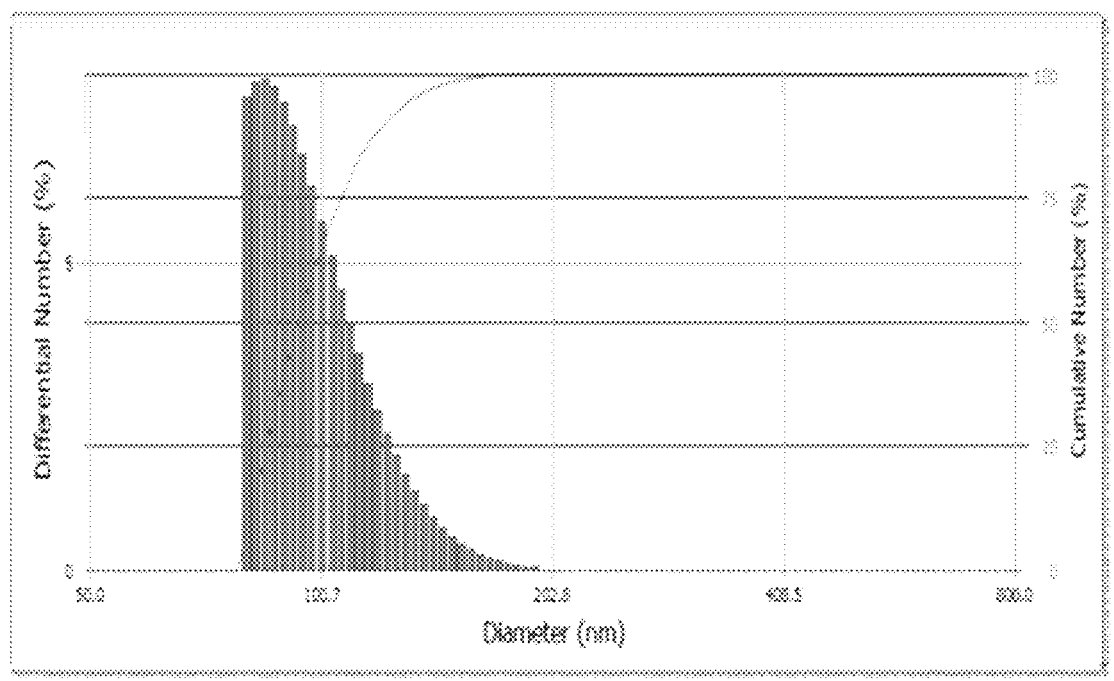
FIG. 2 shows particle size distribution of PH22_BM_A nanoparticles with an average size of about 100 nm.

FIG. 2 describes the particle size distribution of PH22_BM_A nanoparticles. The measurements were carried out by the particle size analyzer (model: DelsaNano; supplier: Beckman Coulter, U.S.), based on the photon correlation spectroscopy (PCS) technique. As shown in the figure, the average particle size was about 100 nm. Particle-size distribution analysis was performed on the nanoparticles only, which were found to be the most superior adsorbent in the study. The average particle size of the remaining three types of beads (APH_04, APH_22, APH_40) having different metals ratio was found to be approximately the same (about 0.8 mm) after sieving.

Example 3: Adsorption of Fluoride and Arsenic by the Multi-Functional Adsorbents Adsorption tests: Stock solutions of fluoride and arsenic (V), each with a concentration level of 500 ppm, were prepared from the salts of sodium fluoride (NaF) and disodium hydrogen arsenate ($HNa_2AsO_4.7H_2O$), respectively, in ultrapure water. From the stock solutions, various test-solutions were prepared in conical flasks, each containing 50 cc of the test solution but different concentrations of the solute (fluoride at 10-100 ppm or arsenic(V) at 1-50 ppm). A definite amount (~0.05 g) of the prepared adsorbents was transferred to the conical flasks. The flasks containing the test solutions and adsorbents were sealed with parafilm and then kept in a mechanical shaker (125 rpm) at a temperature of 30° C. with a variation of ±1° C. All the test samples were prepared in triplicate for reproducibility.

From the intermediate samplings and analysis of the solutions in the shaker, the adsorption equilibrium was found to be attained in approximately 6-8 hours. After equilibrium, the flasks were released from the shaker, and the solutions were filtered by Whatman filter paper to separate the liquid from the adsorbents. The liquid was then centrifuged at a high speed (1000 rpm) for 30 minutes to induce the precipitation of the suspended particles out of the solution. The centrifuged solutions were again filtered through the 0.22μ size filter paper. The solution was analyzed for ion-concentrations by an ion chromatograph (Metrohm IC 861) equipped with a guard column (IC SEP AN2 GUARD) and a main anion column (Metrosep A Supp 5, 250/4.0 mm). The calibration of the instrument was performed every time with and prior to the sample analysis. The instrument was calibrated with the standard solutions of arsenic(V) and fluoride purchased from Merck. The lower limit of detection for the instrument was 0.1 mg/L, and the variation in the analysis was less than ±1.0 mg/L for both salts. The retention times for As(V) and fluoride were observed to be approximately 28 minutes and 12 minutes, respectively, following the sample injection. Samples of both solutes were also periodically analyzed during the adsorption tests to ascertain variations in pH during the adsorption.

The adsorbed amounts of F and As ions by the prepared adsorbents were calculated from the species balance equation of $q (mg/g) = V(C_i - C_e)/w$, where q is the amount (mg/g) of ions adsorbed, $C_i$ is the initial ion concentration (mg/L) and $C_e$ is the equilibrium ion concentration (mg/L) in the solution, V is the volume (L) of the solution, and w is the weight (g) of the adsorbent.

Example 4: Characteristics of Multi-Functional Adsorbents

Surface area, pore volume and pore size distribution (PSD): The surface characteristics such as the specific surface area, pore volume and PSD of the different adsorbents prepared in this study were determined by an Autosorb 1C (Quantachrome, USA) instrument. The multipoint Brunauer, Emmett, and Teller (BET) surface area was measured using the nitrogen adsorption/desorption isotherm. The isotherm data were experimentally obtained using N2 as an adsorbent gaseous molecule at 77 K. Prior to the measurements, the samples were degassed at 200° C. for 8 hours to remove any adsorbed water or trapped gases in the samples. The total pore volume was measured from the amount of N2 adsorbed at the relative pressure close to unity (0.9994). The PSD was calculated from the desorption isotherms by the Barrett, Joyner, and Halenda (BJH) method for mesopores (2-40 nm) and the density functional theory (DFT) for micropores (<2 nm).

Figure 3:
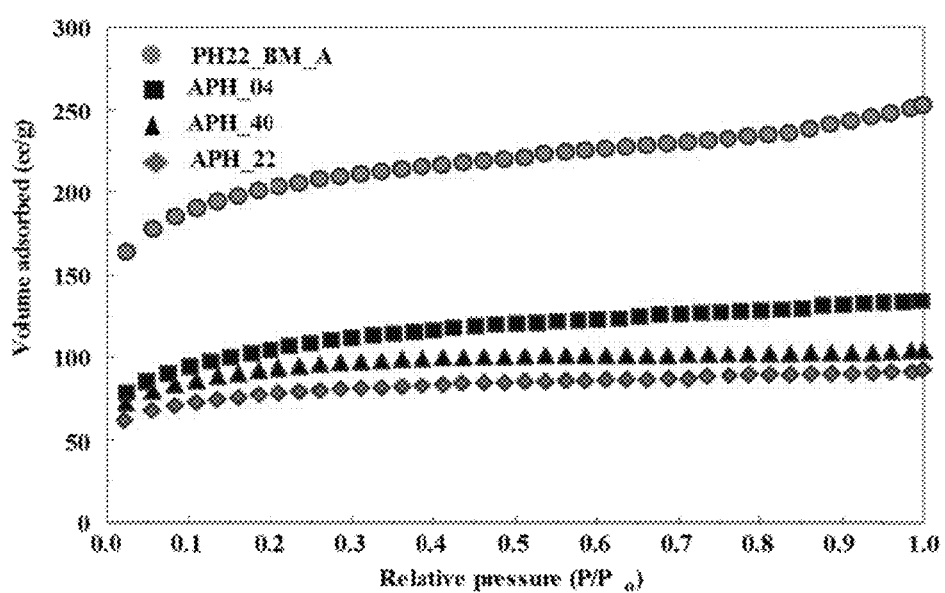
FIG. 3 shows the adsorption isotherms of the different synthesized adsorbents.

FIG. 3 shows the adsorption isotherms of the different adsorbents prepared in this study. For all samples, the volume of adsorbed gas (i.e. $N_2$) steeply increased below $P/P_o \approx 0.05$, before gradually leveling off. As shown in the plots, the adsorption equilibrium was established at a low relative pressure (<0.4). The samples exhibited the adsorption isotherm of type I, which is a characteristic of materials predominantly having micropores. For PH_22_BM_A nanoparticles, a steep increase in the adsorbed volume was observed beyond P/Po≈0.9. This is a common characteristic of $N_2$-adsorption isotherms and is observed in most of the nano-structured materials.

Table 1 presents the data for the BET area, total pore volume and micro- and mesopore volumes calculated as per the IUPAC norms from the isotherms. There are four salient observations to make. (1) Milling followed by carbonization and activation significantly increased the BET area of the prepared materials. The BET area (~750 $m^2/g$) of the PH22_BM_A nanoparticles was nearly twice that of the activated metals-doped beads. (2) All adsorbents were mostly microporous having micropore volumes 60-80% of the total pore volume. (3) The maximum variation in the BET area of the prepared beads (APH_40, APH_31, APH_22, APH_13 and APH_04) was small (~80 $m^2/g$) in comparison to their average BET area (~330 $m^2/g$), which suggests that the bi-metal (Al/Fe) doped beads prepared in this study may be considered to possess approximately the same specific area. In general, the Fe-doped beads had a larger BET area than the Al-doped beads.

Scanning electron microscopy (SEM) and electron dispersive X-ray (EDX) analysis: The SEM and EDX analysis were conducted on various samples of the prepared adsorbents by a Field Emission SEM (Supra VP40, Zeiss) instrument. The surface morphologies and elemental distribution of the pre- and post-adsorbed specimens were investigated by SEM imaging and EDX mapping of several locations on the samples. The representative images and maps are presented and described herein for each adsorbent.

Figure 4:
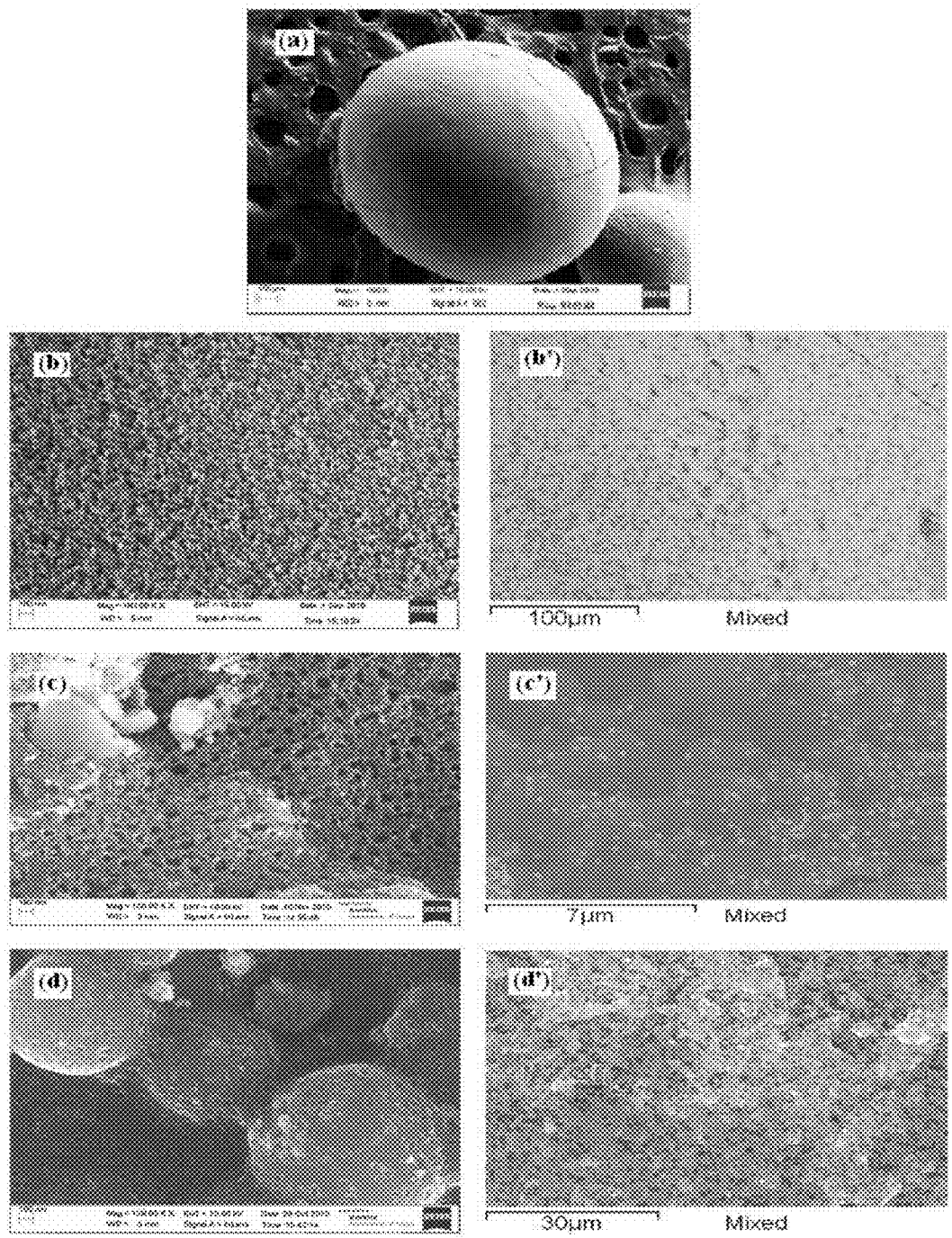
FIG. 4 shows SEM images of the Al-doped activated phenolic beads (APH_40): (a) spherical bead (0.8 mm), (b) porous surface and EDX spectra, (b') EDX mapping: oxygen, aluminum, and carbon, (c) activated surface after fluoride adsorption with (c') EDX mapping fluorine, aluminum, and carbon, and (d) after arsenic adsorption with (d') EDX mapping: arsenic, aluminum, and carbon.
Figure 5:
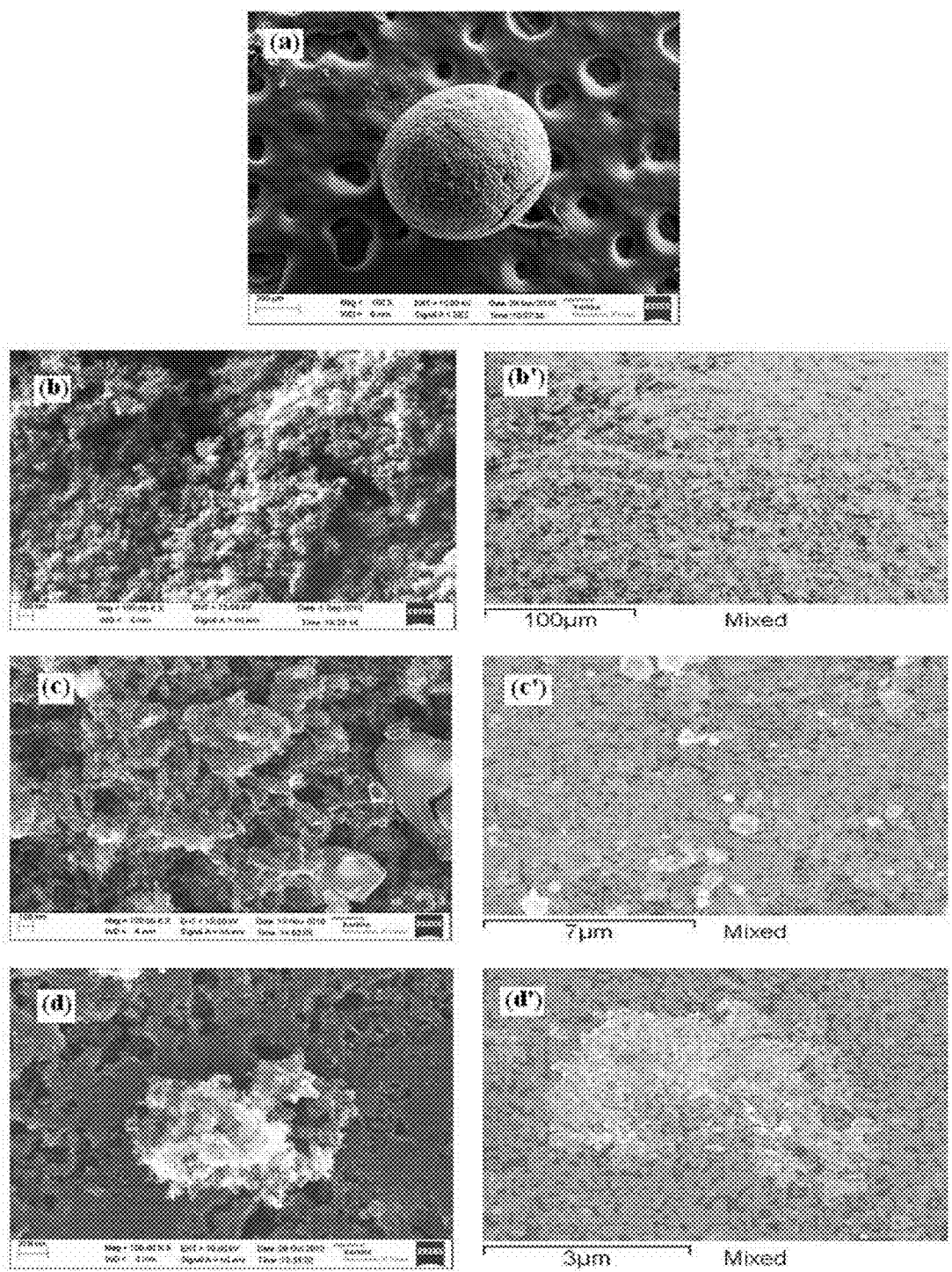
FIG. 5 shows SEM images of Fe-doped activated phenolic beads (APH_04): (a) spherical bead (0.8 mm), (b) porous surface, (b') EDX mapping: iron, oxygen, carbon, (c) activated surface after fluoride adsorption with (c') EDX mapping; iron, fluorine, carbon and (d) after arsenic adsorption with (d') EDX mapping: iron, arsenic, and carbon.
Figure 6:
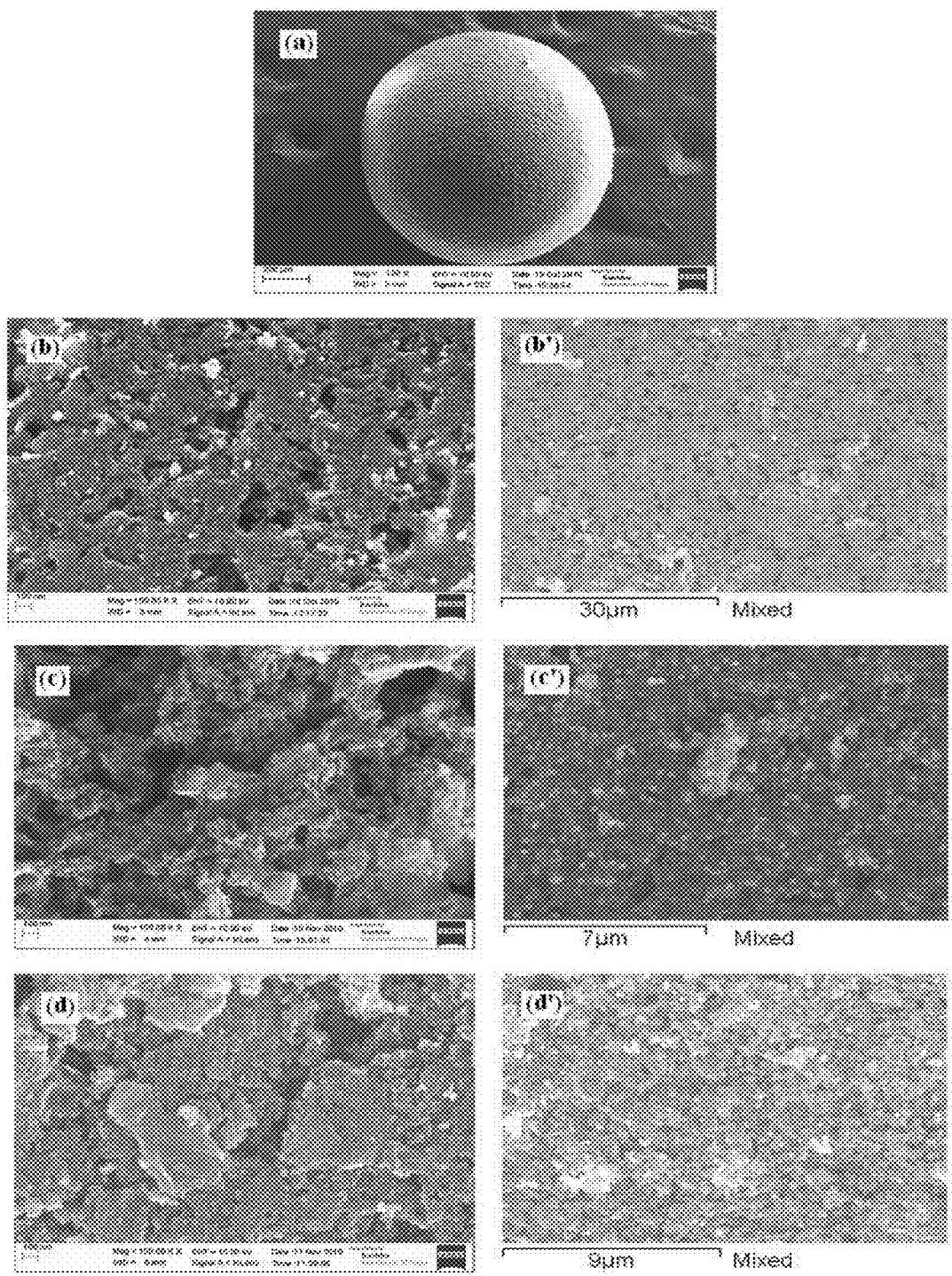
FIG. 6 shows SEM images of Al/Fe-doped activated phenolic beads (APH_22): (a) spherical bead (0.8 mm), (b) porous surface, (b') EDX mapping: iron, aluminum, carbon, (c) activated surface after fluoride adsorption with (c') EDX mapping: iron, aluminum, fluorine and (d) after arsenic adsorption with (d') EDX mapping: iron, aluminum, and arsenic.
Figure 7:
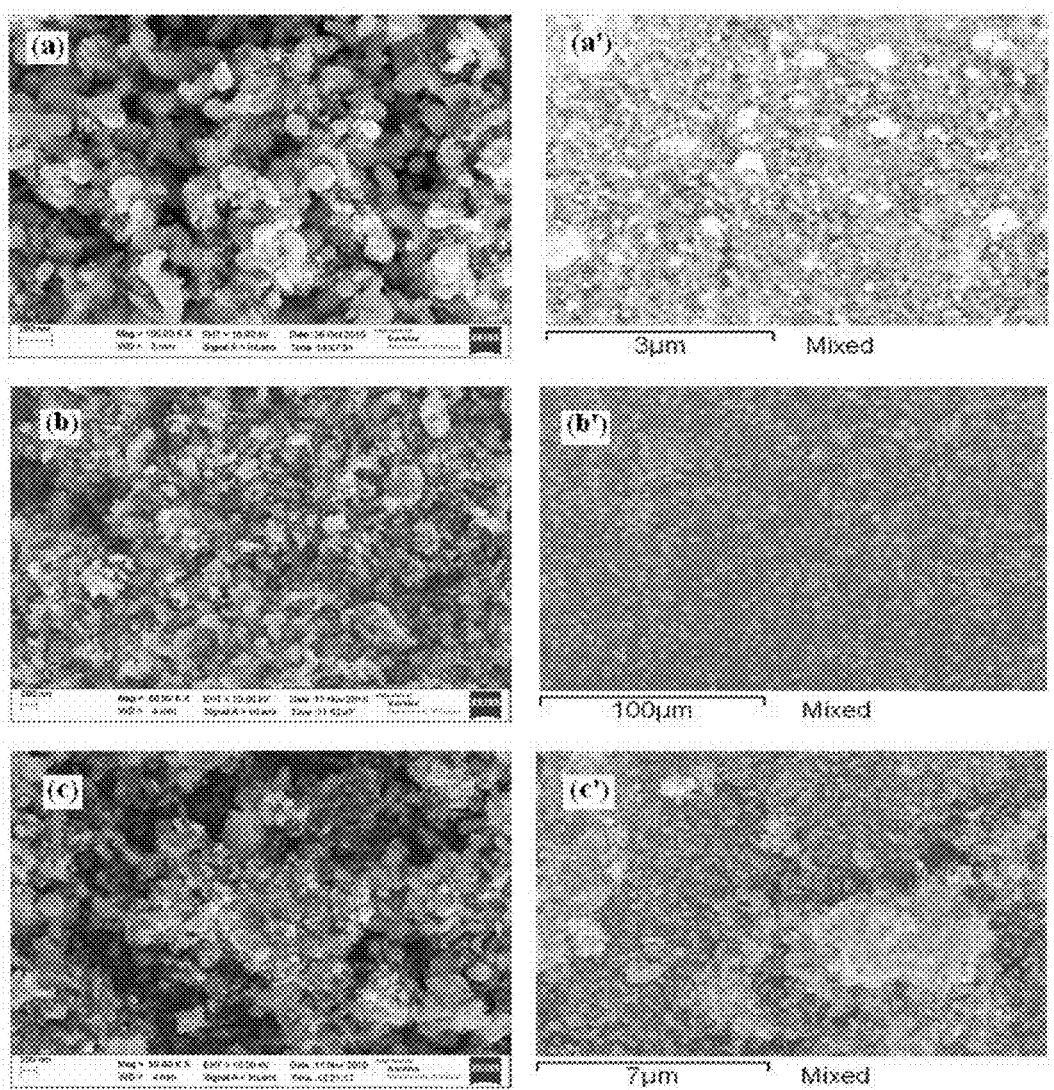
FIG. 7 shows SEM images of Al/Fe-doped non-activated phenolic beads followed by Ball-Mill and then activation (PH22-BM-A): (a) porous surface, (a') EDX mapping: iron, aluminum, carbon, (b) activated surface after fluoride adsorption with (b') EDX mapping; iron, aluminum, fluorine and (c) after arsenic adsorption with (c') EDX mapping: iron, aluminum, and arsenic.

FIGS. 4-6 contain the SEM images of the APH_40, APH_22, and APH_04 samples, before and after adsorption. Each figure contains an image of the prepared bead at 150× magnification, followed by images of the surface at 100 KX, before and after the adsorption of fluoride and arsenic. FIG. 7 contains the SEM images of the PH22_BM_A nanoparticles, before and after adsorption. The corresponding EDX elemental maps are shown on the right-hand-side of the figures.

From the comparative examination of the images (FIGS. 4-6a) of the adsorbents, APH_40, APH_22, and APH_04, distinct differences between the morphologies of their external surfaces may be observed. (1) The surface of the Al-doped beads was smoother than the Fe-doped beads. (2) The latter adsorbents were relatively more porous. (3) The surface of the Al/Fe-doped beads was also porous, although to a relatively lesser extent. The images (FIGS. 4-6b) taken at the larger magnification (100 KX) confirm the increasing porosity in the external surface of the beads with the increasing Fe-content. As observed in FIGS. 4-6(c-d), the surface morphology of the prepared beads also changed following the adsorption of fluoride or arsenic. By comparing the respective images of the fluoride and arsenic adsorbed surfaces, the agglomeration of the adsorbed phase on the latter can be observed.

As shown in FIG. 7a, the surface morphology of the PH22_BM_A nanoparticles was distinctively different from the millimeter sized beads. (Ball) Milling caused breakage of the beads, originally sized at about 0.8 mm, to nanoparticles of the average size of about 200 nm. Most of the breakage or rupturing occurred in the macro-pores of the beads, resulting in the creation of nonporous nanoparticles. Similar to the surface changes of the beads after adsorption, the nanoparticle surfaces also changed following the adsorption of fluoride or arsenic, as observed from the SEM images presented in FIGS. 7b and 7c, respectively. In addition, particle agglomeration was observed on the surface of the adsorbents treated with arsenic (FIG. 7c).

The corresponding EDX maps for three adsorbents, APH_40, APH_22, and APH_04, discussed above are shown in FIGS. 4-6(b'-d'). The maps for PH22_BM_A (nanoparticles) are in FIGS. 7(a'-c'). The mapping confirmed the presence of Al in APH_40, APH_22, and PH22_BM_A, and Fe in APH_04, APH_22, and PH22_BM_A. The elemental mapping also confirmed the presence of arsenic and fluoride in all four adsorbents, suggesting that both fluoride and arsenic may be adsorbed by the beads doped with Al or Fe alone, although to different extents. If the number-density of the different elements shown on the maps is used as the qualitative indicator of their incorporation extent in the beads, the amount of fluoride adsorbed by the different adsorbents may be considered to be in the following order: PH22_BM_A>APH_40>APH_22>APH_04. Alternatively, the amount of arsenic adsorbed by the different adsorbents may be considered to be in the following order: PH22_BM_A>APH_04>APH_22>APH_40. The quantitative descriptions of the relative adsorption capacities of the prepared adsorbents are described and discussed in the following section. The elemental carbon and oxygen were also detected by the EDX analysis. No other impurities were detected. The SEM and EDX results of the other adsorbents, namely APH_31 and APH_13, are not included here for brevity.

Atomic absorption analysis (AAS) measurements: The iron and aluminum contents of the various prepared adsorbent samples were determined by AAS. The samples were first added to an aqua regia solution in a beaker. The beakers were then placed on a shaker. The metal-leaching was performed for six hours. After leaching, the metals contents of the treated solutions were measured using a Varian (model: Carry 100) AAS. The data obtained from the AAS analysis are reported in Table 1. As shown, the iron content in APH_04 was about 35 mg/g, which significantly increased to 103 mg/g in the PH22_BM_A nanoparticles. On the other hand, the aluminum content in APH_40 was about 8.4 mg/g, which also increased to about 18 mg/g in the nanoparticles. As also observed from the table, the mass ratio of Al and Fe is approximately 1:4.1 in APH_22 and 1:5.6 in the nano-adsorbents (PH22_BM_A). These data may be compared to 1:4.7 as the stoichiometric ratio of Al and Fe used in the reaction mixture. The difference between the elemental ratios for APH_22 and PH22_BM_A is attributed to the different extent of leaching for Al and Fe. Based on the AAS data, the extent of Fe-leaching may be considered to be larger than that of Al from the nanoparticles.

Adsorption data: FIGS. 8(a) and 8(b) present the equilibrium concentrations of the fluoride and arsenic(V) ions, respectively, in the solid phase as a function of the aqueous phase concentrations, for samples APH_40, APH_22, APH_04, and PH22_BM_A. Each plot essentially represents the equilibrium isotherm of the solutes for the different adsorbents at 300 C over the aqueous phase concentration range of about 0.1-85 mg/L or ppm. As shown, the solid phase concentrations monotonically increased with the increasing aqueous phase fluoride or arsenic(V) concentrations and asymptotically reached a maximum value for each adsorbent. This maximum value corresponded to the saturation capacity of the adsorbent.

In general, the Fe-doped micro sized beads were observed to have a larger arsenic adsorption capacity than the Al-doped beads. Alternatively, the Al-doped beads had a larger fluoride adsorption capacity than the Fe-doped beads. The salient result is the considerable fluoride adsorption efficiency observed for APH_04, suggesting that Fe may also be used for the removal of fluoride from water.

A surprising result was the considerable adsorption efficiency observed for the combined Al- and Fe doped adsorbents, mainly APH_22 that was tested for the remediation of water laden with either fluoride or arsenic. The APH_22 adsorption capacities for fluoride and arsenic(V) were about 45 mg/g and 20 mg/g, respectively, corresponding to the aqueous phase concentration of 60 ppm for the respective ions. The equilibrium ion loadings were much higher than the reported literature values in most cases and comparable in a few cases, for fluoride or arsenic. Therefore, the PH22_BM-A nanoparticles, which were synthesized by the milling of their parent micro sized beads followed by activation, have a much larger specific area (about 750 m$^2$/g) and therefore, have an even higher adsorption capacity than the micro sized adsorbents prepared in this study, for fluoride and arsenic(V) ions. As previously stated, the different adsorbents had nearly the same specific areas (average 330 m$^2$/g with variation of ±50 m$^2$/g). Therefore, the varying equilibrium loading extents of fluoride or arsenic(V) ions on the micro size adsorbents (beads) may be attributed to the different amounts of metals (Al and Fe) incorporated into the beads. However, the superior performance of the nanoparticle based adsorbent (PH22_BM-A) is attributed predominantly to the relatively larger number of active sites available for adsorption, as reflected by its significantly large BET area (~750 m2/g). It is also important to mention that the WHO guidelines are prescribed for the total arsenic, As(III) and As(V), in potable water. In that context, the removal of As(V) is relatively easy.

Figure 8:
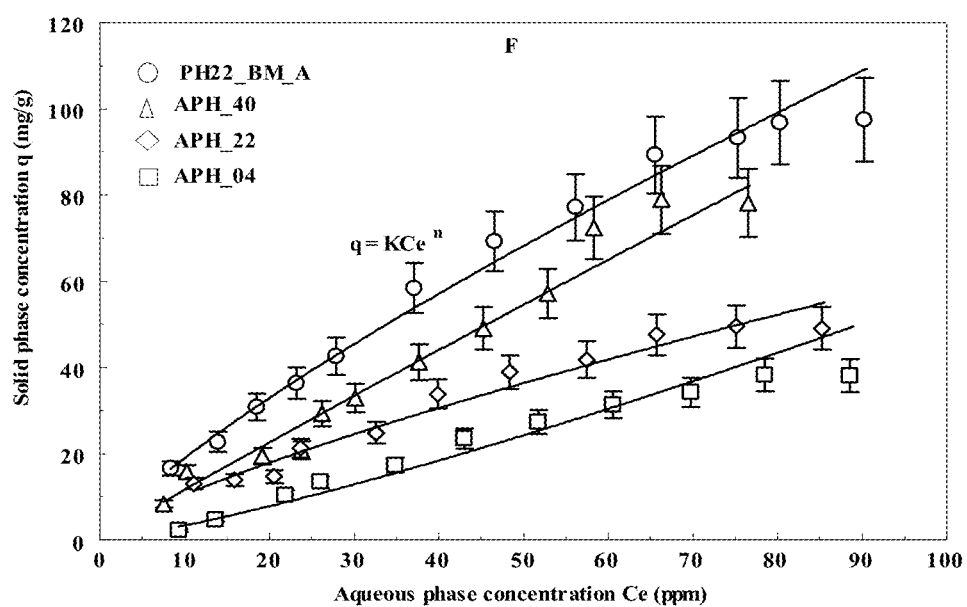
FIG. 8 shows adsorption equilibrium isotherm on the different types of metal-doped phenolic beads for (a) fluoride (k=3.03, 1.28, 1.77, and 0.19 and n=0.79, 0.96, 0.77, and 1.24 for PH22_BM_A, APH_40, APH_22 and APH_04, respectively) (b) arsenic (k=3.47, 1.37, 0.57, and 0.86 and n=0.58, 0.78, 0.88, and 0.61 for PH22_BM_A, APH_04, APH_22 and APH_40, respectively).
Figure 9:
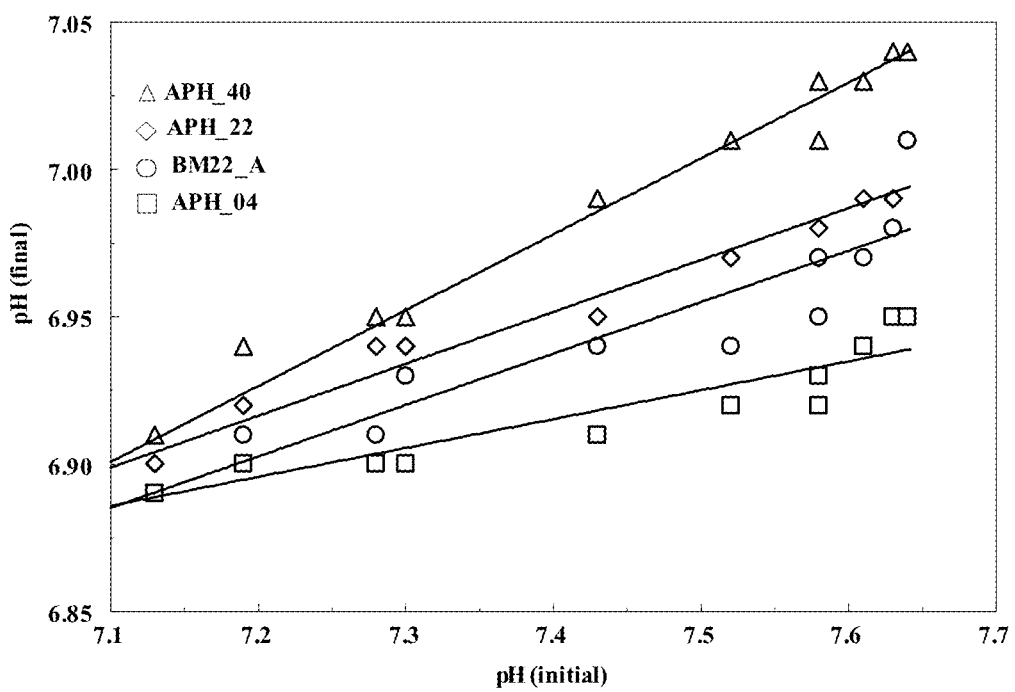
FIG. 9 shows pH variation before and after the adsorption of fluoride.

As also shown in FIGS. 8 (*a*) and (*b*), the Freundlich isotherm equation q=K×Cn, where C (mg/L) and q (mg/g) are the concentration in the solution and amount of solute adsorbed at equilibrium, was used to fit the equilibrium data of fluoride and As(V) ions in water. In general, the Freundlich isotherm describes the multilayer adsorption with heterogeneous surface energies. The equilibrium adsorption data were also fitted by the Langmuir isotherm, q=Q×k×C/(1+k×C), where Q (mg/g) is the maximum solute loading (mg/g) and k (L/mg) is the Langmuir coefficient. However, the Langmuir isotherm equation could not explain the data, suggesting that the surface coverage with the solutes (F/As (V) ions) exceeded a monolayer. To this end, the values for Freundlich constants, K and the power of isotherm n, measurement of the adsorption capacity and that of adsorption intensity, respectively, are reported in the figure.

pH variation during the adsorption and the proposed adsorption mechanism: The pH variation during the adsorption tests was monitored for both fluoride and arsenic ions by periodically taking samples from the test solutions. FIG. 9 shows the change in the solution pH before and after the adsorption of fluoride onto the four different adsorbents (APH_04, APH_22, APH_40 and PH22_BM_A). The initial pH values corresponded to the different initial concentrations (5-90 ppm) of the fluoride in the test solutions that were brought in contact with the four adsorbents. As shown, the pH of the test solutions was initially in the range of 7.1-7.6 and marginally decreased (maximum by about 0.6) following adsorption to the range of 6.8 and 7.0. A small decrease in the pH of the arsenic solutions was also observed. In this case, the pH values of the test solutions were initially in the range of 7.4-8.0 and decreased to the range of 6.7-7.4 (data not shown). The small pH variation during the adsorption suggests that post-treatment (after defluoridation or arsenic-removal) of water treated by the adsorbents prepared in this study may not be required.

Figure 10:
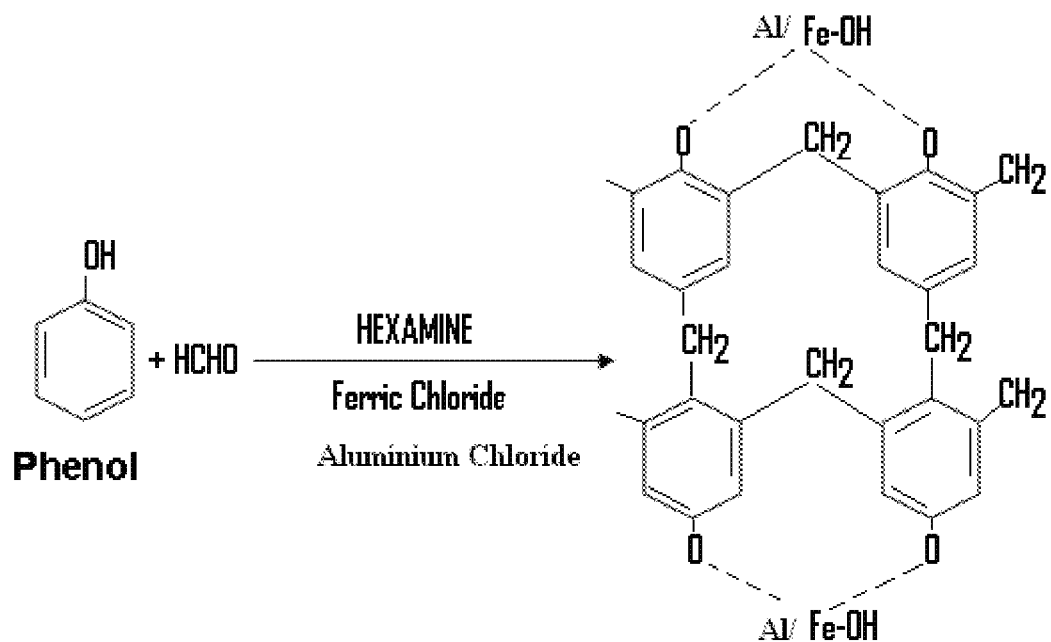
FIG. 10 shows a reaction scheme for the formation of the phenolic beads doped with Fe and Al.

FIG. 10 describes a tentative molecular structure of aluminium and iron doped synthesized polymeric adsorbents in this study. A step growth polymerization occurs between phenol and formaldehyde. Initially phenol reacts with formaldehyde to form hydroxymethyl phenol. The hydroxymethyl group then reacts with wither free ortho or para site of the phenol or another hydroxymethyl group. This is followed by the incorporation of Fe/Al as shown in FIG. 10.

Figure 11:
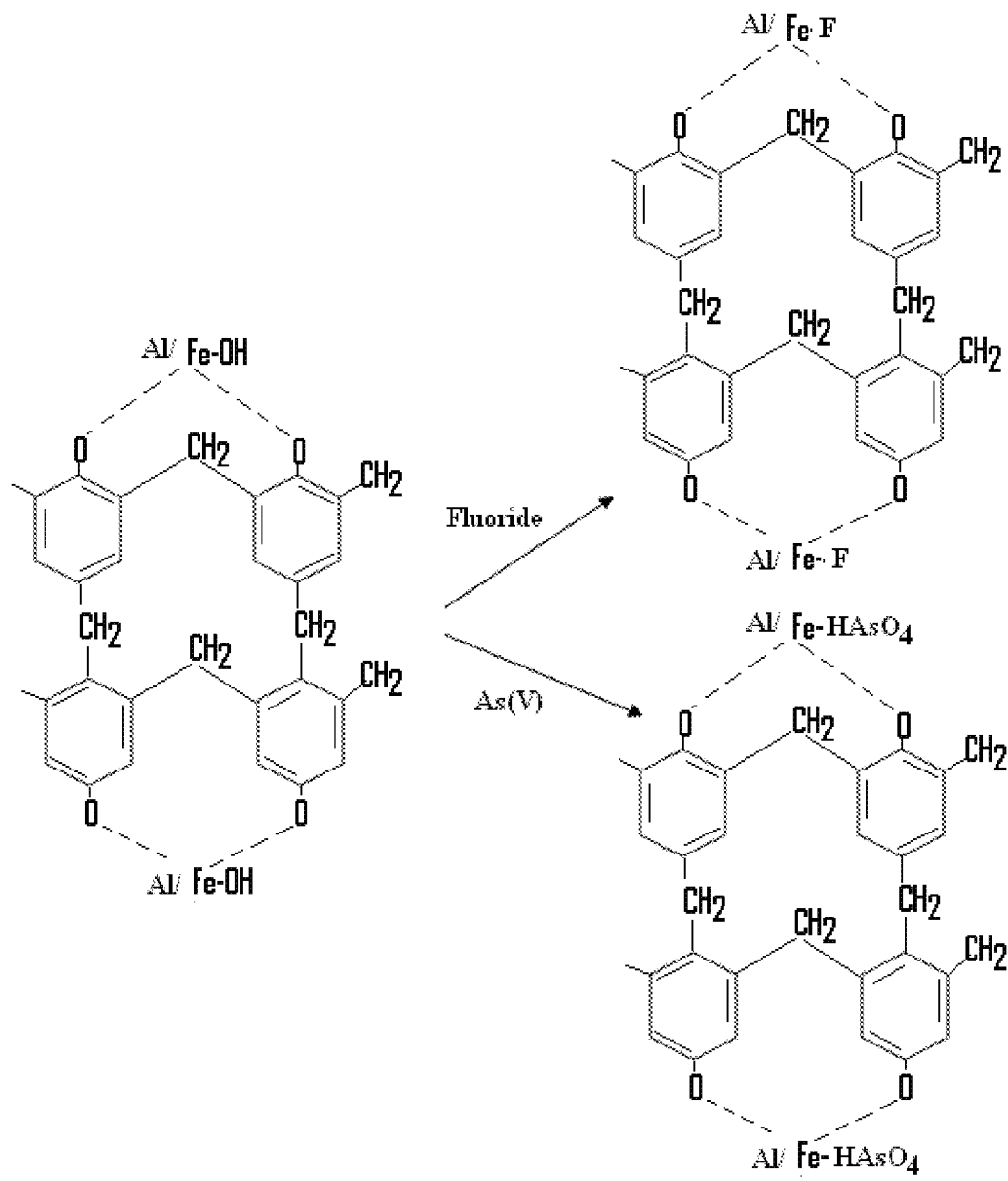
FIG. 11 shows a predicted structure of phenolic polymeric beads after the adsorption of fluoride and As(V) ions.

FIG. 11 depicts a probable molecular structure of the polymeric beads after adsorption with As(V) and fluoride ions. In the case of fluoride ions, under the present experimental conditions of pH varying between 6 and 7.5, fluoride ions are predominantly adsorbed by the following reaction: ≡MOH+F-↔≡MF+HO— where, M represents metal ion (Fe or Al), MOH represents the surface hydroxyl group, and MF the surface site occupied by a fluoride ion. The above reaction represents the ligand exchange interactions between the fluoride ions and hydroxyl groups that are found to occur at or near the neutral pH region. With regard to As(V), the species exist in several anionic forms ($H_2AsO_4$—, $HAsO_4$2-, and $AsO_4$3-) in water above pH 3.0. Therefore, it could be removed by the cationic Fe/Al OH2+ by the following reaction: Fe/Al $(OH)_2$++As (V)↔Fe/Al $HAsO_4$—.

Figure 12:
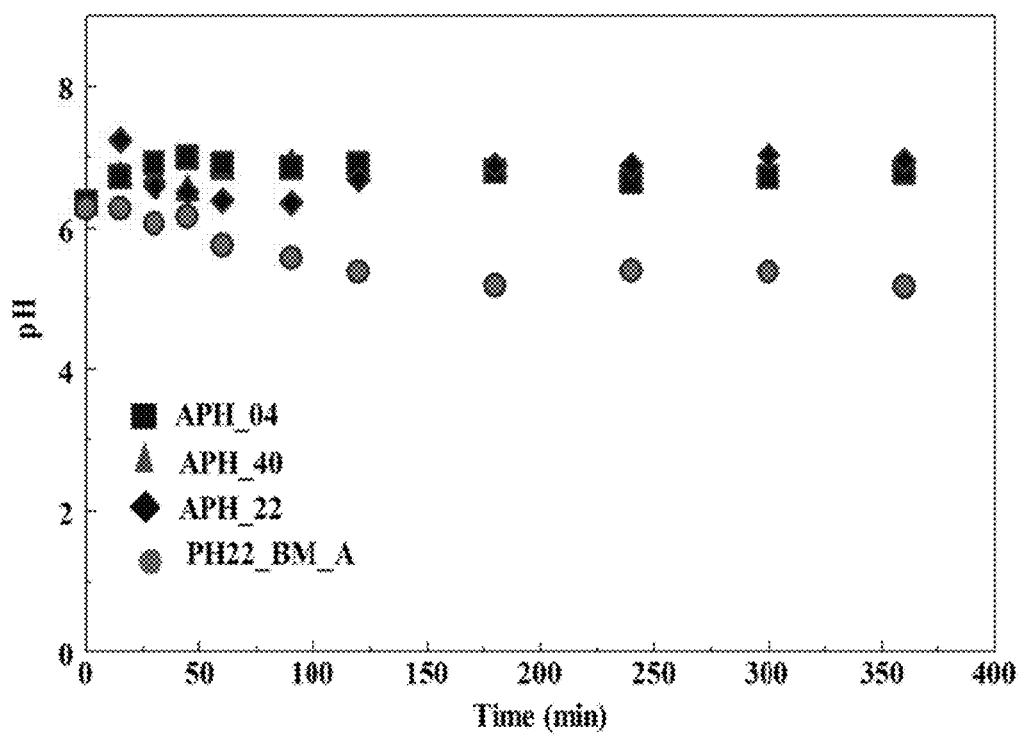
FIG. 12 shows pH-variation in pure water (without F and As) with different adsorbents.

The pH-variation was also determined apriori for the various samples of pure water containing different adsorbents, however, without containing solutes (arsenic or fluoride). FIG. 12 describes the data for such conditions. As observed, there is practically no variation in pH. The maximum variation (about 0.7) was observed in the case of PH22_BM_A.

Figure 13:
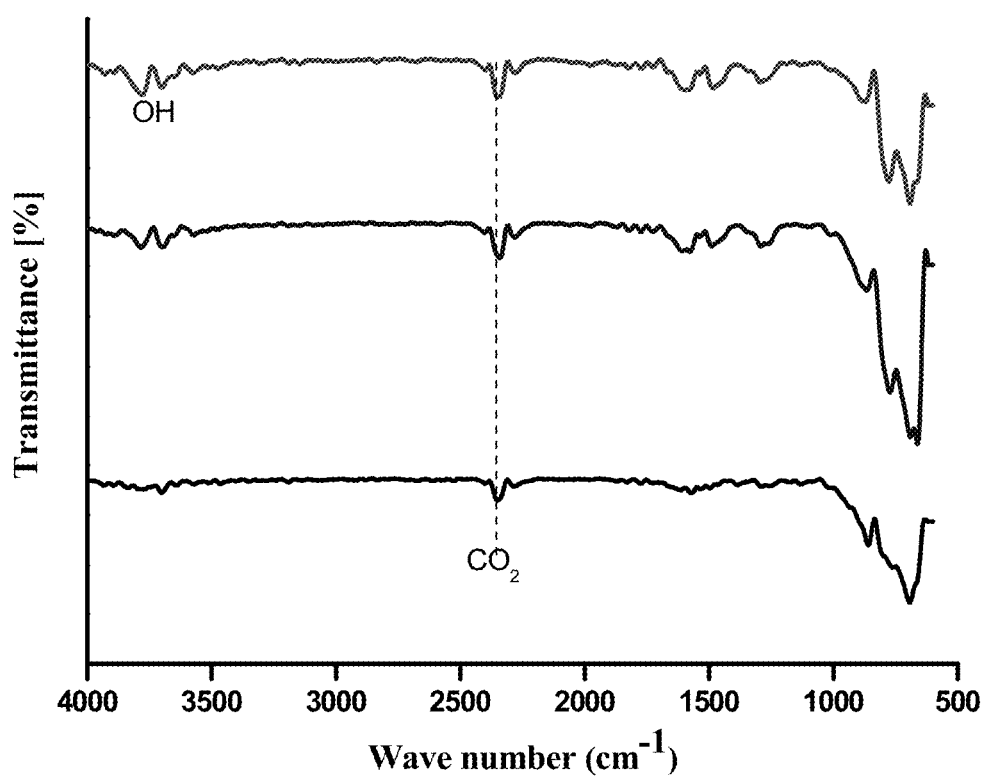
FIG. 13 shows FTIR spectra of PH_22_BM_A before and after arsenic and fluoride adsorption.

To further corroborate the proposed mechanism of ion exchange between the Fe or Al-particles and the adsorbate molecule (As/F ions), FT-IR spectra were taken for the various adsorbents before and after adsorption. FIG. 13 is a representative spectra of the nanoadsorbents (PH22_BM_A). It is evident from the spectrum that there is a change in the stretching vibration of phenolic O—H group before and after adsorption of fluoride as well as As(V) ions at 3700 cm$^{-1}$, which further confirms the ion exchange mechanism.

Conclusions: Al and Fe were successfully incorporated into polymeric beads during an intermediate step of the synthesis by suspension polymerization. The synthesized Al and Fe doped, activated micron (about 0.8 mm) and nano (about 100 nm) sized porous adsorbents were shown to possess significant loadings of fluoride (about 100 mg/g) and arsenic(V) (about 40 mg/g) ions, which were larger than or comparable to the literature data. The various surface characterization analytical instruments used in the study confirmed the presence and dispersion of the incorporated metals onto the considerably large surface area (about 760 m$^2$/g) of the prepared porous carbon based adsorbents. The methodology adopted in this study to prepare bi-metal doped carbon based porous adsorbents can be used water remediation applications.

Example 5: Preparation and Use of Multi-Functional Adsorbents Configured to Adsorb Arsenic and Fluoride The adsorbents were prepared by suspension polymerization. The metals were incorporated during a polymerization step. The bi-metals doped polymeric beads (about 0.5 mm) thus prepared were carbonized and activated to create porous structure inside the materials. Nanoparticles (about 100 nm) were produced by milling of the beads, which were also carbonized and activated. The polymerization reaction was carried out in a 2-L three-neck glass vessel, which was mounted over a heating mantle and equipped with a reflux water condenser, thermometer and continuous stirrer.

50-g of phenol as the monomer was heated to the molten stage before mixing it with 65 ml of formaldehyde as solvent and 1.5 ml of TEA as a basic catalyst. The reactant mixture was stirred at 390 rpm and 30° C. Upon the solution becoming homogeneous in about 7 hours, 200 ml of distilled water was added to the reaction vessel. After 30 minutes, 3.5 g of HMTA, a cross linking agent was added, and the vessel was heated at a rate of 3 C/minute until the temperature reached 100° C. Approximately 45 minutes after the addition of hexamine, 2.5 g of PVA as a suspension stabilizing agent was added. Approximately 35 minutes after the PVA was added, any of the two metal-salts (aluminium nitrate, ferric chloride, nickel nitrate, cupric chloride) were added sequentially. A time varying between 3-7 minutes was maintained between the addition-times of two salts, depending on the types of metals-combination. The amounts of two salts could be varied, with different proportions, for example, 4:0, 3:1, 2:2, 1:3, 0:4, etc, to the reaction mixture, keeping the total amounts of the salts constant at 4 g. The experimentally optimized amounts of monomer, solvent, catalyst, cross-linking agent, suspension stabilizing agent, and time and temperature of the different reaction steps were adjusted to produce spherical shaped products (beads) after curing.

After the addition of the salts, the reaction mixture continued to be heated. During the reaction, the speed of the stirrer was never allowed to fluctuate from the initially fixed set value to avoid solidification of the product. After 3 hours, the heating was stopped, and the reactor was allowed to cool in the still air. When the temperature of the reaction products reached room temperature, the products were filtered to separate the solids from the residual liquid. The filtered product (spherical beads of an average size of about 0.5 mm) was washed three times with distilled water, then by methanol, followed by acetone. Finally, the prepared beads were sieved. In a typical experiment, the yield was approximately 35 g.

The prepared polymeric beads were carbonized and then physically activated using steam in a horizontal tubular furnace. The beads were carbonized in a ceramic boat at 1050° C. for 1 hour under a $N_2$ atmosphere. Prior to the carbonization, the beads were pre-heated from room temperature to the carbonization temperature at a heating rate of 5° C./min. Subsequent to the carbonization, the activation was performed for 1 hour by steam at 900° C. in the same tubular furnace. The yield of the carbonized and activated bi-metals beads typically varied between 40% and 45% of the initial weight of the polymeric beads. The carbonization and activation caused an approximately 60% reduction in the particle size, with the average size of the carbonized/activated beads measured as ~0.5 mm. Some samples of the polymeric beads were crushed by ball-milling to the nano-size (~100 nm). These particles were also carbonized and activated in the same tubular furnace to create activated nano particles containing bi-metals. The activation and carbonization conditions were the same as those used for preparing the activated beads, except that the carbonization and activation temperatures were set to 1000° C. and 850° C., respectively, which were slightly lower than the previous conditions. The lower temperatures were chosen to minimize the yield-loss of the products.

The surface morphologies and elemental distribution of the prepared specimens of bi-metals doped micro/-nanoadsorbents were investigated by SEM imaging and EDX mapping of several locations on the samples. The representative images and maps are presented herein. As observed, the external surface is porous. The EDX mapping of the material confirms the presence of Al and Fe on the surface. The surface morphology of the metals incorporated nanoparticles was distinctively different from the millimeter sized beads. (Ball) Milling caused breakage of the beads, original sized at ~0.5 mm, to nanoparticles of the average size of ~100 nm. Most of the breakage or rupturing occurred in the macro-pores of the beads, resulting in the creation of nonporous nanoparticles. The corresponding EDX mapping also confirmed the presence of two metals (Al/Fe).

The adsorption capacities observed for fluoride and arsenic(V) were about 45 mg/g and 20 mg/g, respectively, corresponding to the aqueous phase concentration of 60 ppm for the respective ions.

Example 6: Purification of Drinking Water

A filter comprising a multi-functional absorbent comprising Fe and Al is attached in line with a water supply meant for consumption. The water is passed through the filter and the arsenic and fluoride is adsorbed onto the particles and removed from the water. The water is safely consumed.

Example 7: Purification of Pond Water

Multi-functional adsorbents comprising iron, or salt thereof, and aluminum, or salt thereof, is added to a pond that can be used for drinking water. The arsenic and fluoride present in the pond is adsorbed onto the particles. The purified water is removed from the pond. Any remaining adsorbents are removed from the water before the water is consumed. The adsorbents can be removed by another filter that is in the supply line.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method of preparing a polymeric bead comprising a plurality of metal salts, the method comprising:
   preparing a mixture of one or more monomers, a cross-linking agent, a suspension stabilizing agent, and the plurality of metal salts, under conditions sufficient to produce the polymeric bead doped with the plurality of metal salts,
   wherein the one or more monomers comprises an aromatic alcohol, and
   wherein the plurality of metal salts comprises salts of Al and Fe, or Fe and Ni, or Al and Ni, or Cu and Ni, or Cu and Fe, or Cu and Al.

2. The method of claim 1, comprising heating the one or more monomers with a solvent and a catalyst to form a heated mixture.

3. The method of claim 2, comprising contacting the heated mixture with an aqueous solution to yield a first mixture.

4. The method of claim 3, comprising contacting the first mixture with the cross-linking agent to yield a cross-linked mixture.

5. The method of claim 4, comprising contacting the cross-linked mixture with the suspension stabilizing agent to yield a second mixture.

6. The method of claim 5, comprising contacting the second mixture with the plurality of metal salts to yield a third mixture.

7. The method of claim 6, comprising heating and cooling the third mixture to produce a composition comprising the polymeric bead.

8. The method of claim 1, further comprising isolating the polymeric bead.

9. The method of claim 1, further comprising fractionating the polymeric bead to produce a composition comprising the polymeric bead of substantially uniform diameter.

10. The method of claim 1, further comprising activating the polymeric bead prior and carbonizing the activated polymeric bead.

11. The method of claim 1, further comprising reducing the size of the polymeric bead.

12. The method of claim 1, wherein the aromatic alcohol is phenol, vinyl benzyl alcohol, cresol, butylphenol, or any combination thereof.

13. The method of claim 1, wherein the suspension stabilizing agent is polyvinyl alcohol (PVA), gum acacia powder (GAP), polyvinylpyrrolidone, or any combination thereof.

14. A method of preparing a polymeric bead comprising a plurality of metal salts, the method comprising:

preparing a mixture of one or more monomers, a cross-linking agent, a suspension stabilizing agent, and the plurality of metal salts, under conditions sufficient to produce the polymeric bead doped with the plurality of metal salts, wherein the one or more monomers comprises an aromatic alcohol, and wherein the plurality of metal salts consists salts of Al and Fe, or Fe and Ni, or Al and Ni, or Cu and Ni, or Cu and Fe, or Cu and Al.

15. The method of claim 14, comprising heating the one or more monomers with a solvent and a catalyst to form a heated mixture.

16. The method of claim 15, comprising contacting the heated mixture with an aqueous solution to yield a first mixture.

17. The method of claim 16, comprising contacting the first mixture with the cross-linking agent to yield a cross-linked mixture.

18. The method of claim 17, comprising contacting the cross-linked mixture with the suspension stabilizing agent to yield a second mixture.

19. The method of claim 18, comprising contacting the second mixture with the plurality of metal salts to yield a third mixture, and further comprising heating and cooling the third mixture to produce a composition comprising the polymeric bead.

20. The method of claim 19, further comprising isolating the polymeric bead.

* * * * *